(12) United States Patent
Okada et al.

(10) Patent No.: US 11,176,965 B2
(45) Date of Patent: Nov. 16, 2021

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Mio Okada, Yokohama Kanagawa (JP); Toru Watanabe, Kawasaki Kanagawa (JP); Gaku Koizumi, Kawasaki Kanagawa (JP); Yusuke Tomoda, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/944,599

(22) Filed: Jul. 31, 2020

(65) Prior Publication Data
US 2021/0272597 A1 Sep. 2, 2021

(30) Foreign Application Priority Data
Mar. 2, 2020 (JP) .............................. JP2020-034865

(51) Int. Cl.
G11B 27/36 (2006.01)
G11B 5/54 (2006.01)
G11B 21/08 (2006.01)
G11B 5/82 (2006.01)
G11B 5/012 (2006.01)

(52) U.S. Cl.
CPC ............ *G11B 21/083* (2013.01); *G11B 5/012* (2013.01); *G11B 5/82* (2013.01)

(58) Field of Classification Search
CPC .... G11B 5/09; G11B 5/17; G11B 5/35; G11B 2005/0021; G11B 2005/0024; G11B 2005/0029; G11B 2005/0002; G11B 2005/0005; G11B 2005/0032; G11B 5/127; G11B 5/187
USPC ....................................... 360/313, 59, 75, 31
See application file for complete search history.

(56) References Cited

U.S. PATENT DOCUMENTS 8,553,358 B2 * 10/2013 Mizushima .......... G11B 5/3909
                                                    360/110
8,643,967 B2    2/2014 Katada et al.
(Continued)

FOREIGN PATENT DOCUMENTS

JP        2014-120190 A      6/2014
JP        2016-54013 A       4/2016

*Primary Examiner* — Nabil Z Hindi
(74) *Attorney, Agent, or Firm* — Allen & Overy, LLP

(57) ABSTRACT

According to one embodiment, a magnetic disk device includes a magnetic disk, a magnetic head including an assist part to assist recording of data into the magnetic disk, a controller configured to control the recording of data by the magnetic head based on a recording condition, and a memory configured to record a first threshold value used to define that an assist element included in the assist part is in a deterioration condition. Furthermore, the controller detects the condition of the assist element, determines whether or not the recording condition is changed based on the detected condition and the first threshold value stored in the memory, and changes the recording condition based on the result of the determination.

6 Claims, 19 Drawing Sheets

(56) References Cited

U.S. PATENT DOCUMENTS

| | | | |
|---|---|---|---|
| 8,896,947 B2* | 11/2014 | Koizumi | G11B 5/40 360/31 |
| 9,691,415 B2* | 6/2017 | Koui | G11B 5/09 |
| 10,014,009 B1 | 7/2018 | Koizumi | |
| 2016/0064020 A1 | 3/2016 | Ikai et al. | |

* cited by examiner

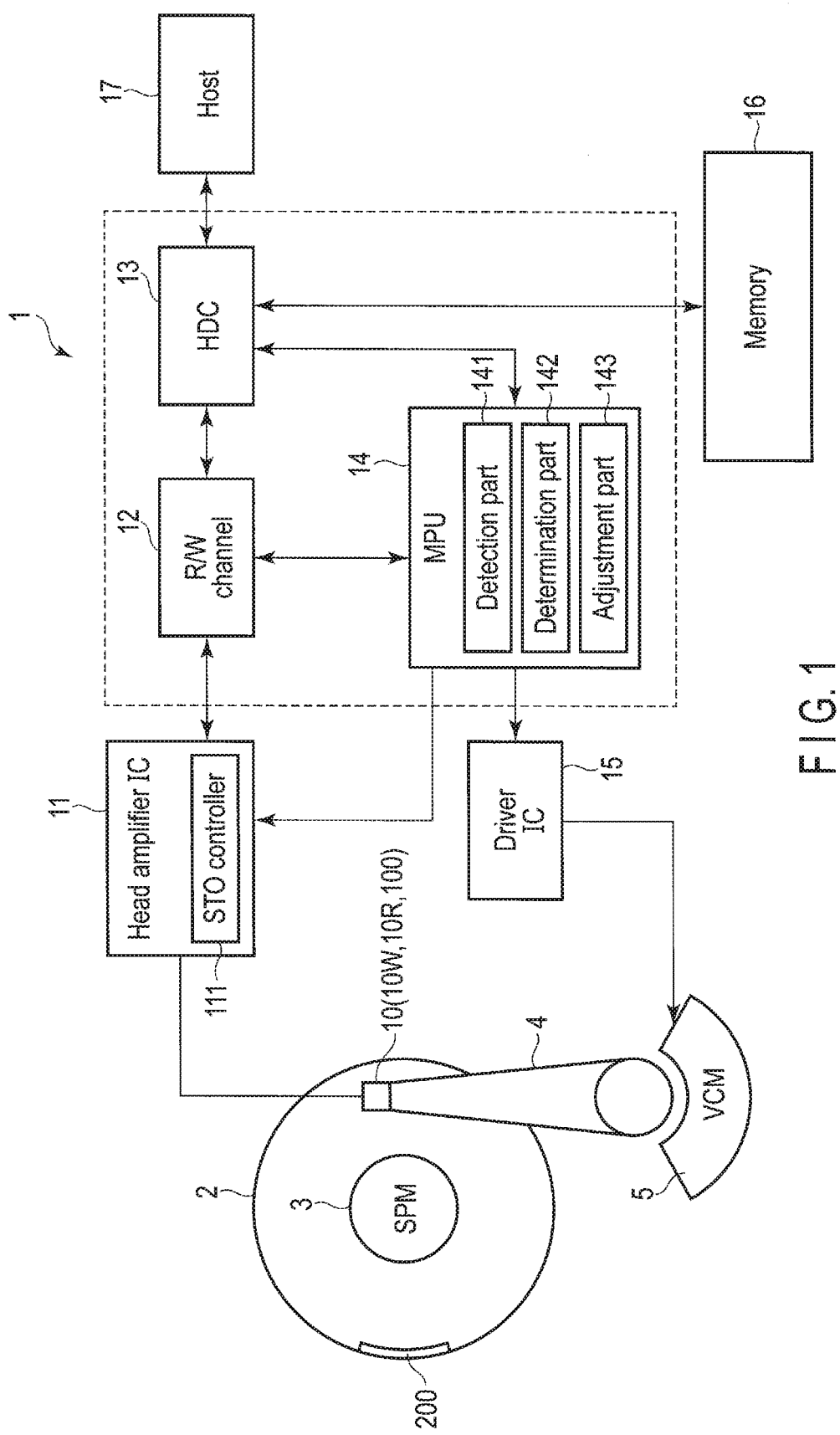
F I G. 1

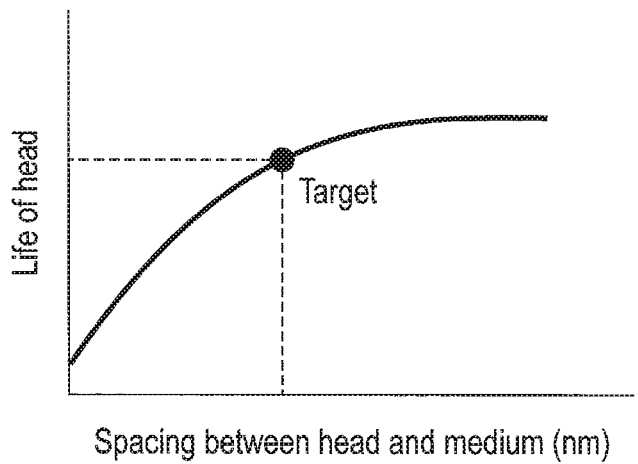
F I G. 10
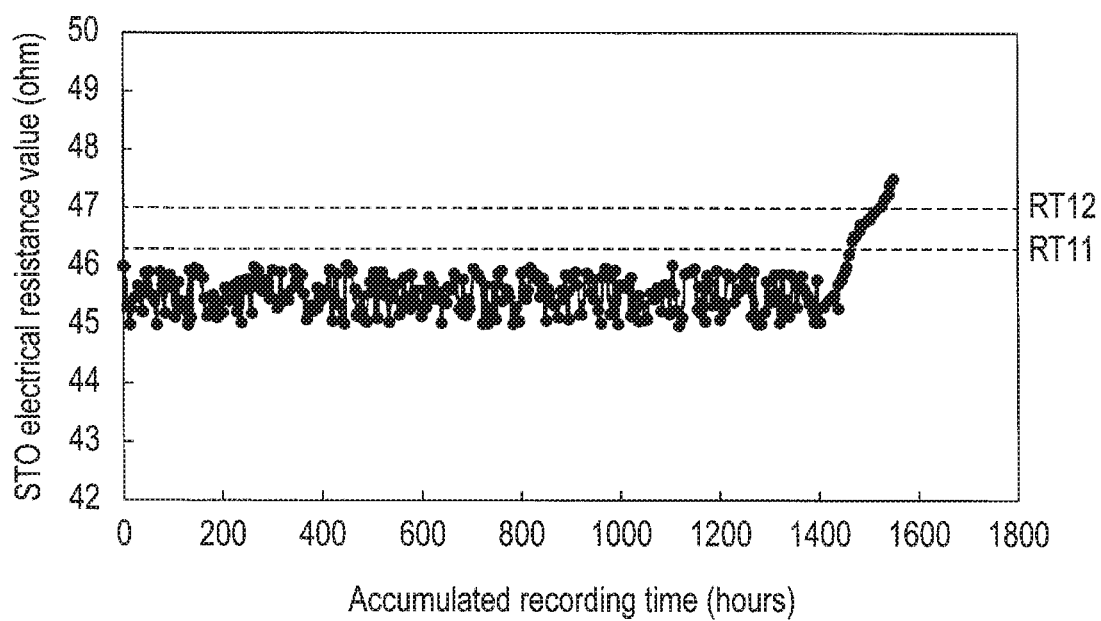
F I G. 11

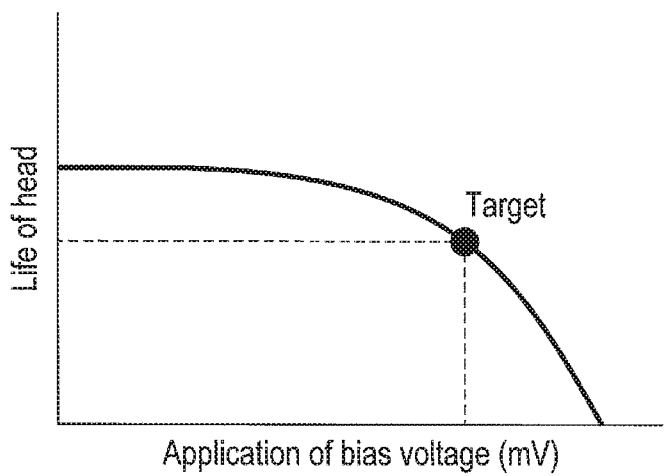
F I G. 14
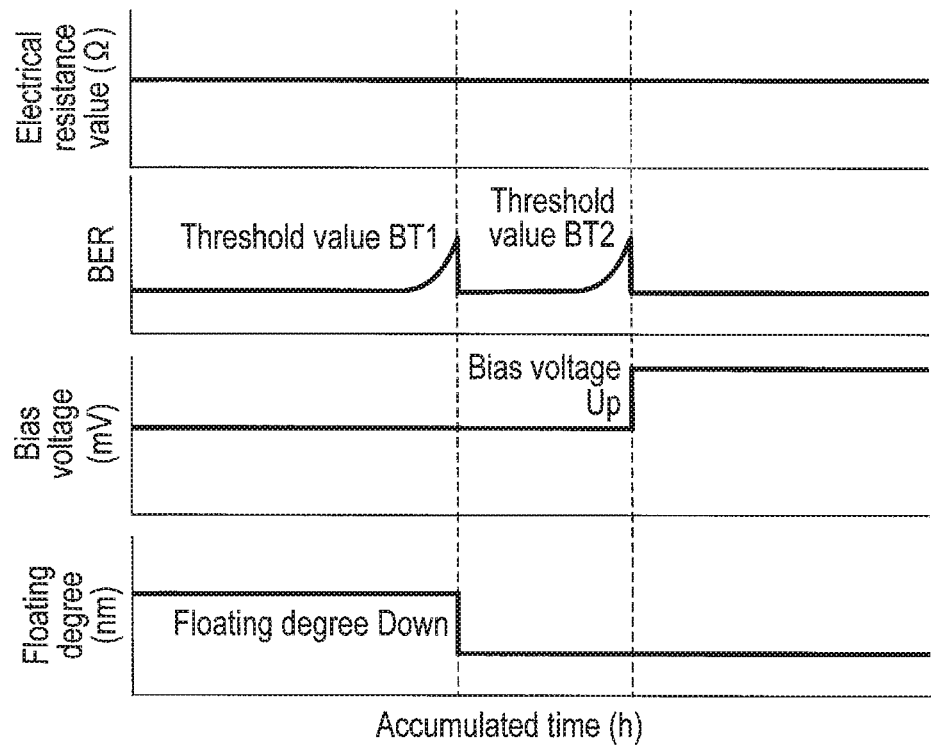
F I G. 15

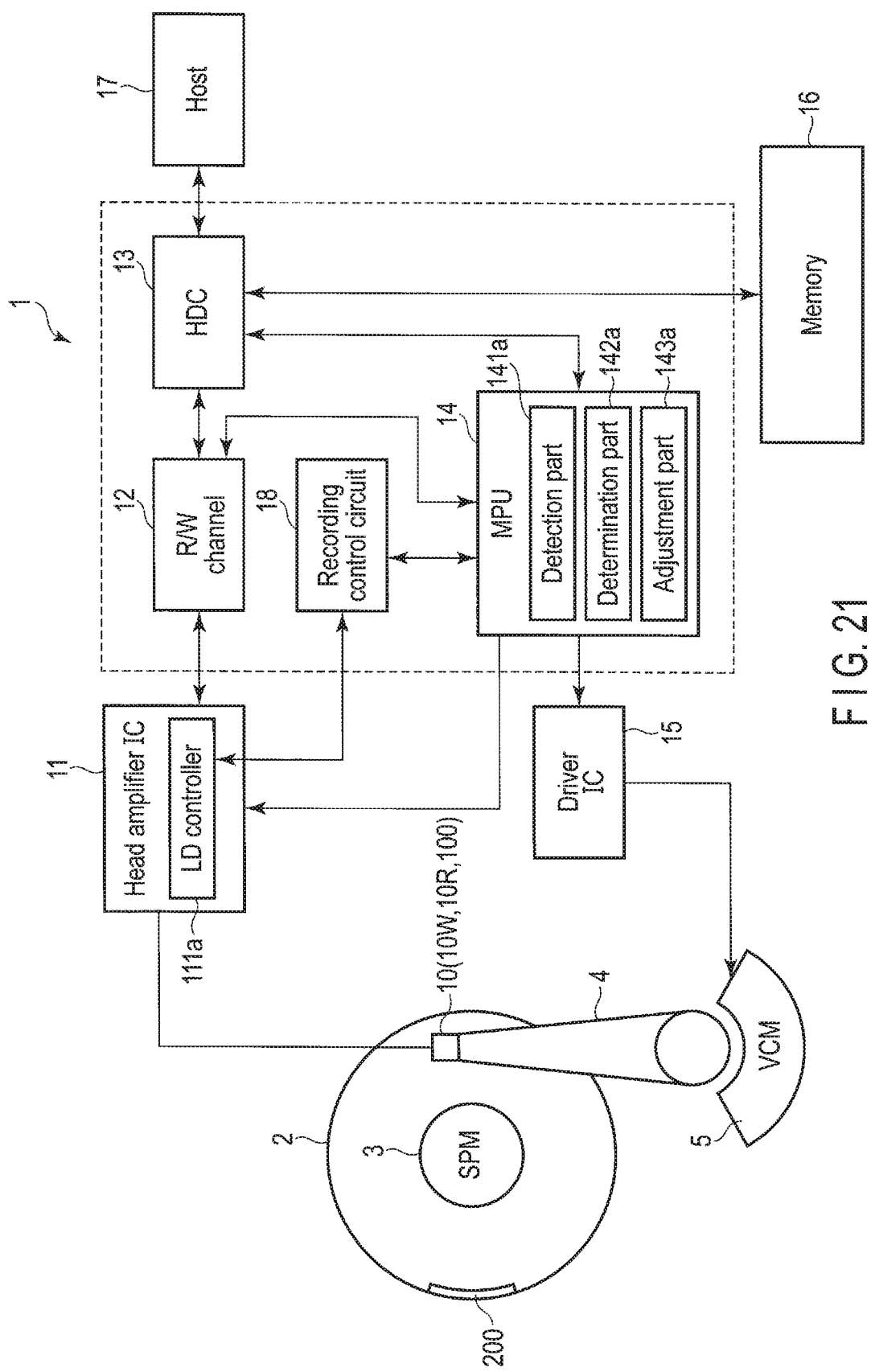
F I G. 21

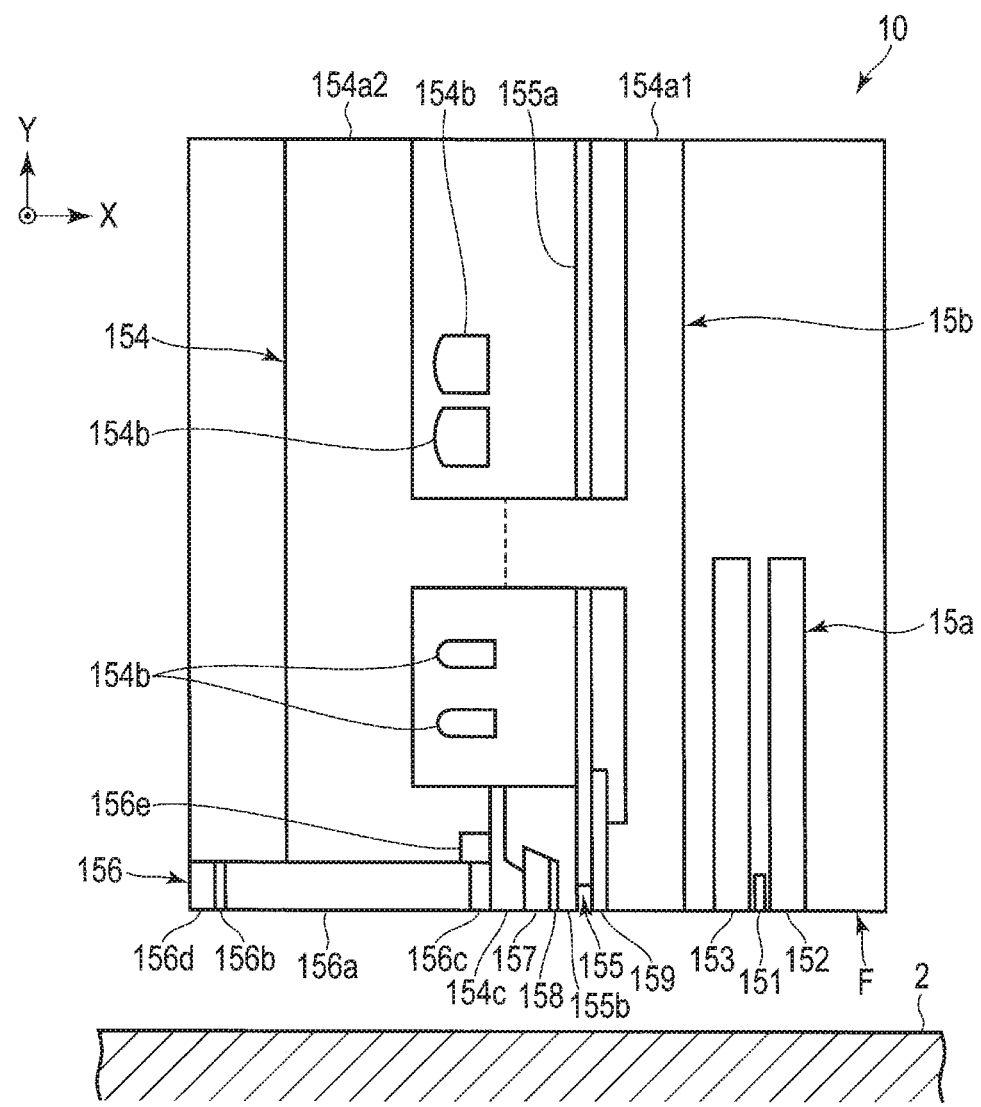
F I G. 22

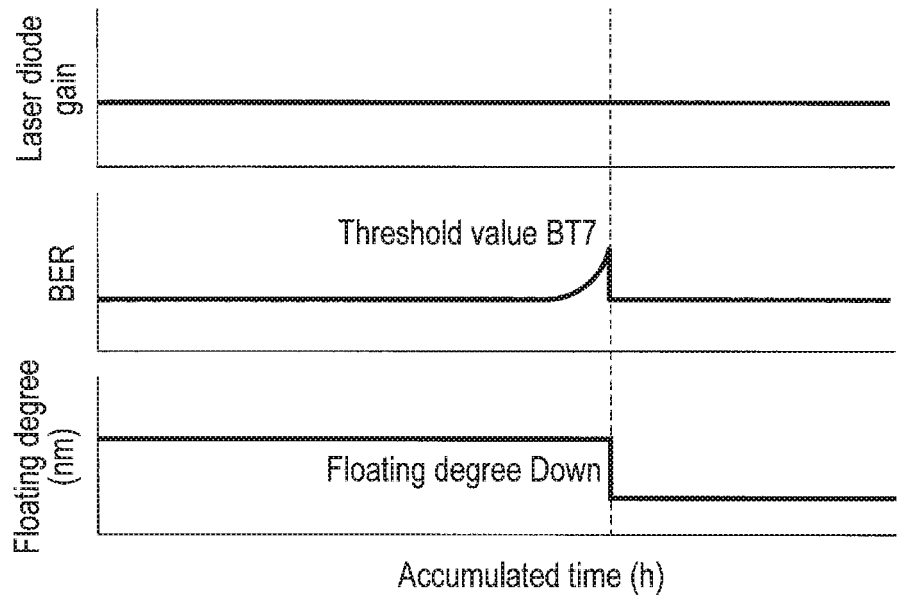
F I G. 34
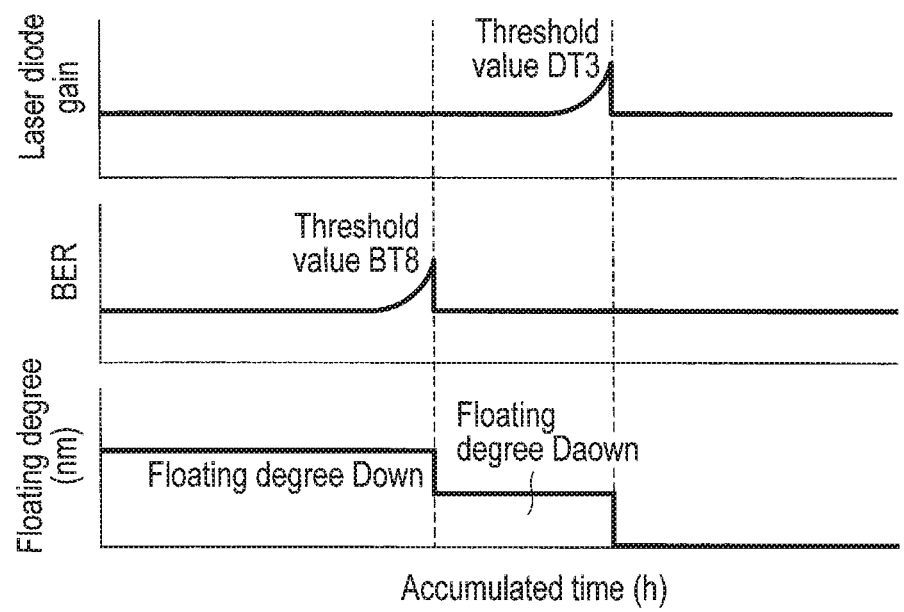
F I G. 35

MAGNETIC DISK DEVICE

CROSS-REFERENCE TO RELATED APPLICATIONS

This application is based upon and claims the benefit of priority from Japanese Patent Application No. 2020-034865, filed Mar. 2, 2020, the entire contents of which are incorporated herein by reference.

FIELD

Embodiments described herein relate generally to a magnetic disk device.

BACKGROUND

Magnetic disk devices with a magnetic head having an assist function incorporated therein are known. The assist function is a function to improve the write performance using high frequency of a high frequency oscillator or near field light of a near field transducer element. In the magnetic disk device of this type, when the write operation of data is continued using the oscillator or the element, the high frequency oscillator or the near field transducer element deteriorates. When the high frequency oscillator or the near filed optical element is deteriorated by aging, the read/write performance is decreased, and the data read/write performance of the magnetic disk device is decreased accordingly.

If tendency of deterioration of the high frequency oscillator or the near field transducer element is found in the magnetic disk device, the deterioration can be suppressed by stopping the assist function or restricting the amount of assist.

However, if the stopping or the restriction is performed, the read/write performance cannot be maintained, and thus, the data read/write performance of the magnetic disk device decreases. Furthermore, if the tendency of deterioration of the oscillator or the element is not found but tendency of deterioration of bit error rate is found, error in the read/write occurs frequently while the write operation is continued, and thus, the data read/write performance of the magnetic disk device decreases.

The present application presents a magnetic disk device which can suppress the deterioration of elements used in the assist function while maintaining the read/write performance and can be used continuously.

BRIEF DESCRIPTION OF THE DRAWINGS

FIG. 1 illustrates an example of the structure of a magnetic disk device of a first embodiment.

FIG. 10 illustrates an example of a relationship map between a life of a magnetic head and spacing between a head and a medium of the second embodiment.

FIG. 11 illustrates two-step threshold values of a third embodiment.

FIG. 14 illustrates a relationship map between a life of a head and application of bias voltage of the fourth embodiment.

FIG. 15 is a timing chart of an example of timing of the fourth embodiment.

FIG. 21 illustrates an example of the structure of a magnetic disk device of a tenth embodiment.

FIG. 22 is a cross-sectional view of an example of the structure of the magnetic head of the tenth embodiment.

FIG. 34 is a timing chart indicative of an example of control timing of a twelfth embodiment.

FIG. 35 is a timing chart indicative of an example of control timing of a thirteenth embodiment.

DETAILED DESCRIPTION

Figure 2:
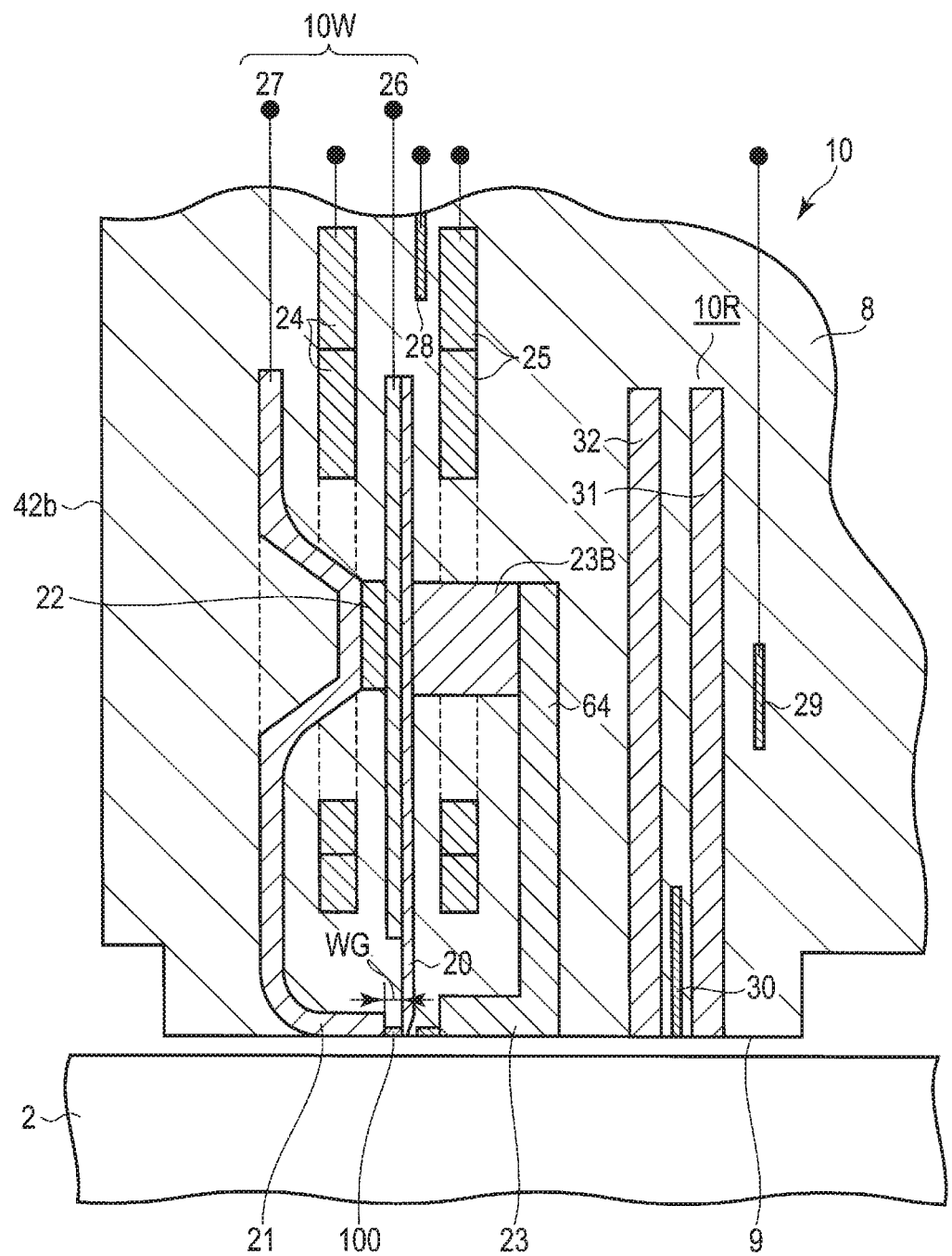
FIG. 2 is a cross-sectional view of an example of the structure of the magnetic head of the first embodiment.

In general, according to one embodiment, a magnetic disk device includes a magnetic disk, a magnetic head including an assist part to assist recording of data into the magnetic disk, a controller configured to control the recording of data by the magnetic head based on a recording condition, and a memory configured to record a first threshold value used to define that an assist element included in the assist part is in a deterioration condition. Furthermore, the controller detects the condition of the assist element, determines whether or not the recording condition is changed based on the detected condition and the first threshold value stored in the memory, and changes the recording condition based on the result of the determination.

Embodiments will be described hereinafter with reference to the accompanying drawings. The disclosure is merely an example, and proper changes within the spirit of the invention, which are easily conceivable by a skilled person, are included in the scope of the invention as a matter of course. In order to make the description clearer, the widths, thicknesses, shapes, etc., of the respective parts are schematically illustrated in the drawings, compared to the actual modes. In the specification and drawings, the same elements as those described in connection with preceding drawings are denoted by like reference numerals, and a detailed description thereof is omitted unless otherwise necessary.

First Embodiment

FIG. 1 illustrates an example of the structure of a magnetic disk device of a first embodiment.

As in FIG. 1, the magnetic disk device 1 is, for example, a hard disk drive (HDD), and includes a magnetic disk 2, spindle motor (SPM) 3, actuator 4, voice coil motor (VCM) 5, magnetic head 10, head amplifier IC 11, R/W channel 12, hard disk controller (HDC) 13, microprocessor (MPU) 14, driver IC 15, and memory 16. Furthermore, the magnetic disk device 1 is connectable to a host computer (host) 17. The magnetic head 10 includes, as will be described later, a write head (recording head, writer) 10W, read head (resuming head, reader) 10R, and spin torque oscillator (STO) 100 as a high frequency oscillator. Note that the R/W channel 12, HDC 13, and MPU 14 may be incorporated in a one-chip integrated circuit.

The magnetic disk 2 includes, for example, a disk-shaped substrate formed of a nonmagnetic substance. On each surface of the substrate, a soft magnetic layer formed of a material indicative of soft magnetic characteristics as an underlying layer, magnetic recording layer exhibiting magnetic anisotropy which is perpendicular to the disk surface on the underlying layer, and protective film layer thereon, in this order. Here, a direction of the magnetic head 10 will be defined as upper layer.

The magnetic disk 2 is fixed to the spindle motor (SPM) 3 and is rotated at a certain rate by the SPM 3. Note that, instead of one disk, there may be several magnetic disks 2 disposed on the SPM 3. The SPM 3 is driven with drive current (or drive voltage) supplied from the driver IC 15. Data pattern is recorded into/resumed from the magnetic disk 2 by the magnetic head 10. The magnetic disk 2 includes a monitor area 200. The monitor area 200 is an area to store information related to read/write of data. The monitor area 200 is provided with a part of the outermost periphery or innermost periphery of the magnetic disk 2 in the radius direction.

The actuator 4 is rotatably disposed, and the magnetic head 10 is supported on the tip of the actuator 4. The actuator 4 is rotated by the voice coil motor (VCM) 5, and the magnetic head 10 is moved and positioned on a desired track of the magnetic disk 2. The VCM 5 is driven by drive current (or drive voltage) supplied from the driver IC 15.

The magnetic head 10 includes a slider 8, write magnetic head 10W formed on the slider 8, and read magnetic head 10R (cf. FIG. 2). There may be several magnetic heads 10 corresponding to the number of the magnetic disks 2.

The head amplifier IC 11 includes a circuit related to drive of the STO 100 and detection of oscillation characteristics. For example, the head amplifier IC 11 includes a STO controller 111. The head amplifier IC 11 executes the drive of STO 100 and the detection of drive signal, for example. Furthermore, the head amplifier IC 11 supplies a write signal (write current) corresponding to write data supplied from the R/W channel 12 to the write magnetic head 10W. Furthermore, the head amplifier IC 11 amplifies a read signal output from the read magnetic head 10R and transfers the amplified read signal to the R/W channel 12.

The STO controller 111 controls the current supplied to the STO 100 of the write magnetic head 10W. Note that the head amplifier IC 11 further includes a recording coil controller which controls the recording current supplied to the coil of the write magnetic head 10W based on the write signal, resume signal detection part which detects the signal (read data) resumed by the read magnetic head 10R, and heater controller which controls the power supply to the heater which will be described later.

The R/W channel 12 is a signal processing circuit which processes a signal related to read/write. The R/W channel 12 includes a read channel which executes a signal processing of the read data and a write channel which executes a signal processing of write data. The R/W channel 12 converts the read signal to digital data and decode the read data from the digital data. The R/W channel 12 encodes the write data transferred from the HDC 13, and transfers the encoded write data to the head amplifier IC 11.

The HDC 13 controls the data write to the magnetic disk 2 and the data read from the magnetic disk 2 through the magnetic head 10, head amplifier IC 11, R/W channel 12, MPU 14. The HDC 13 structures the interface of the host 17 with the magnetic disk device 1 and executes transfer control of the read data and the write data. That is, the HDC 13 functions as a host interface controller which receives a signal transferred from the host 17 and transfers a signal to the host 17. In a case where the signal is transferred to the host 17, the HDC 13 executes an error correction process of data of resume signal read and encoded by the magnetic head 10. Furthermore, the HDC 13 receives commands (write command, read command, etc.) transferred by the host 17, and transfers the received command to the MPU 14.

The MPU 14 is a main controller (controller) of the magnetic disk device 1, and executes servo control required to control of the read/write operation and to position the magnetic head 10. Furthermore, the MPU 14 includes a detection part 141, determination part 142, and adjustment part 143. The detection part 141 detects a condition of the STO 100. In the present embodiment, the detection part 141 detects an electrical resistance value of the STO 100. The determination part 142 determines whether or not the recording condition of the data recording of the magnetic head 10 is changed based on a result of monitoring of the condition of the STO 100 by the detection part 141 and a threshold value stored in the memory 16 which will be described later. The adjustment part 143 changes the recording condition of the data recording of the magnetic disk 2 of the magnetic head 10 based on the result from the determination part 142. The processes executed by the detection part 141, determination part 142, and adjustment part 143 will be described later.

The driver IC 15 controls the drive of the SPM 3 and VCM 5 in accordance with the drive of the MPU 14. With the drive of the VCM 5, the magnetic head 10 is positioned to a target track on the magnetic disk 2.

The memory 16 includes a volatile memory and a non-volatile memory. For example, the memory 16 includes a buffer memory of DRAM, and a flash memory. The memory 16 stores a program and a parameter (determination value and the like) required for the processing of the MPU 14. Furthermore, the memory 16 stores various threshold values and relationship maps used for the change of recording conditions of the magnetic head 10.

Now, the structure of the magnetic head 10 will be explained.

FIG. 2 is a cross-sectional view of an example of the structure of the magnetic head 10. Initially, as in FIG. 2, the magnetic head 10 includes the write magnetic head 10W and the read magnetic head 10R formed at the end of the slider 8 through a thin film process, and is formed as a separation type head. The slider 8 includes an air bearing surface (ABS) 9 which is a surface opposed to the recoding surface of the magnetic disk 2 to be floated from the recording surface of the magnetic disk 2. The write magnetic head 10W writes data on the magnetic disk 2. The read magnetic head 10R reads data recorded on the magnetic disk 2.

The write magnetic head 10W includes a main magnetic pole 20, return magnetic pole 21, nonconductive substance 22, reading magnetic pole 23, connector (back gap) 23B, first recording coil 24, second recording coil 25, first terminal 26, second terminal 27, and STO 100. The main magnetic pole 20, return magnetic pole 21, and reading magnetic pole 23 are formed of a high permeable magnetic material. The main magnetic pole 20 and the return magnetic pole 21 form a first magnetic core forming a closed magnetic circuit, and a first recording coil 24 is wound around the first magnetic core. Furthermore, the main magnetic pole 20 and the reading magnetic pole 23 form a second magnetic core forming a closed magnetic circuit, and a second recording coil 25 is wound around the second magnetic core.

The main magnetic pole 20 produces a recording magnetic field in a direction perpendicular to the recording surface (recording layer) of the magnetic disk 2. The main magnetic pole 20 extends substantially perpendicular to the recording surface of the magnetic disk 2. The tip of the main magnetic pole 20 in the magnetic disk 2 side is tapered toward the disk surface. A part of the tip of the main magnetic pole 20 is exposed to the ABS 9 of the slider 8. The first terminal 26 is connected to the main magnetic pole 20 to supply the current. For example, the direct current is supplied to the first terminal 26.

The return magnetic pole 21 has a substantial L-letter shape such that the tip thereof in the magnetic disk 2 side is bending toward the main magnetic pole 20. The tip of the return magnetic pole 21 is opposed to the tip of the main magnetic pole 20 with a write gap WG therebetween. The return magnetic pole 21 has a projection in a position apart from the magnetic disk 2 and the projection is connected to the main magnetic pole 20 through the nonconductive substance 22. The first recording coil 24 is wound around the projection. The second terminal 27 is connected to the return magnetic poke 21 to supply the current. For example, as with the first terminal 26, the direct current is supplied to the second terminal 27.

The STO 100 is, within the write gap WG, disposed between the tip of the main magnetic pole 20 and the tip of the return magnetic pole 21. The STO 100 is formed as a substantial cuboid having a layered structure of a magnetic film and a nonmagnetic film by fine processing of the magnetic resistive film. The surface formed of the tip surface of the main magnetic pole 20, tip surface of the return magnetic pole 21, and STO 100 are exposed at the ABS 9, and is arranged to be opposed to the recording surface of the magnetic disk 2. The STO 100 is electrically connected to the main magnetic pole 20 and the return magnetic pole 21 through the nonmagnetic conductive layer. Thus, the an electric circuit which supplies the electricity through the main magnetic pole 20, STO 100, and return magnetic pole 21 is formed. In the STO 100, a spin in a ferromagnetic substance included therein performs a precession movement when current such as direct current is supplied in the layered direction because of the magnetic characteristics of electron. With the recession movement, the STO 100 oscillates at an alternate current signal (high frequency magnetic field) in microwave band. The STO 100 is controlled to be on/off by the STO controller 111 and the recording coil controller based on the control of the MPU 14.

The reading magnetic pole 23 is formed of a soft magnetic substance. The reading magnetic pole 23 is disposed in the opposite side of the return magnetic pole 21 with respect to the main magnetic pole 20, that is, in the reading side of the main magnetic pole 20. The reading magnetic pole 23 is formed as a substantial L-letter shape, and the tip thereof is opposed to the tip of the main magnetic pole 20 with a gap therebetween. The upper end of the reading magnetic pole 23 which is apart from the magnetic disk 2 is connected to the main magnetic pole 20 by the connector 23B which is formed of a magnetic substance. The second recording coil 25 is wound around the connector 23B.

The first recording coil 24 and the second recording coil 25 are wound in the opposite direction. The first recording coil 24 and the second recording coil 25 are connected to each other in series via the head amplifier IC 11. The control of current supply to the first recording coil 24 and the second recording coil 25 is performed by a recording coil controller 112. Note that the control of the current supply to the first recording coil 24 and the second recording coil 25 may be performed separately. The alternate current is supplied to the first recording coil 24 and the second recording coil 25 to excite the main magnetic pole 20.

The read magnetic head 10R includes a magnetic film 30 with a magnetic resistance effect, and shield films 31 and 32 arranged in the trailing side and the reading side of the magnetic film 30 to hold it. The lower end of the magnetic film 30 and the shield films 31 and 32 is exposed on the ABS 9 of the slider 8.

As in FIG. 2, the magnetic head 10 includes a first heater 28 and a second heater 29 functioning as a heat generating element. The first and second heaters 28 and 29 are embedded in the slider 8. The first heater 28 is disposed between the first recording coil 24 and the second recording coil 25 above the main magnetic pole 20, for example. The second heater 29 is disposed in a side position of the shield film 31.

The first and second heaters 28 and 29 are connected to the heater controller of the head amplifier IC 11. When the power is supplied from the heater controller to the first and second heaters 28 and 29, the first and second heaters 28 and 29 generate heat to heat the slider 8 part around thereof. Thus, the slider 8, write magnetic head 10W, and read magnetic head 10R are expanded by heat, and ABS 9 project to the surface side of the magnetic disk 2. In this manner, with the first and second heaters 28 and 29, a floating degree of the magnetic head 10 (a gap between the ABS 9 of the magnetic head 10 and the surface of the magnetic disk 2) can be adjusted. The degree of expansion of the slider 8, write magnetic head 10W, and read magnetic head 10R will be adjusted based on a value of current supplied (voltage applied) to the first and second heaters 28 and 29. That is, the floating degree of the magnetic head 10 is adjusted based on the value of the current supplied (voltage applied) to the first and second heaters 28 and 29. Note that the number of heaters is not limited to two, it may be one or may be three or more.

Figure 3A:
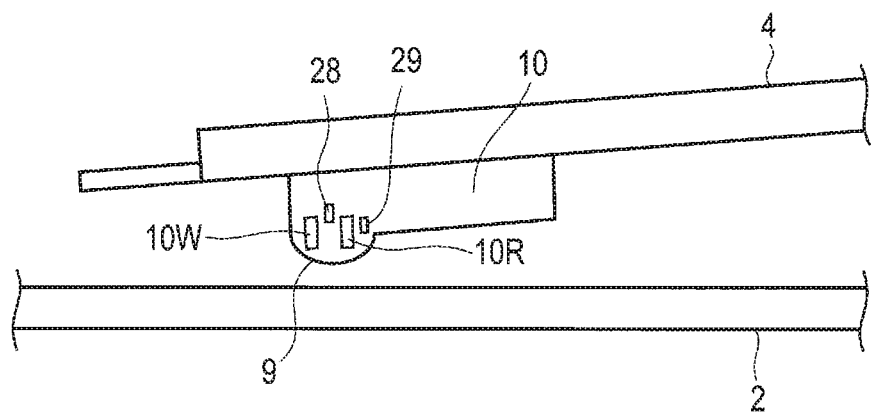
FIG. 3A illustrates adjustment of a floating degree of the magnetic head of the first embodiment.
Figure 3B:
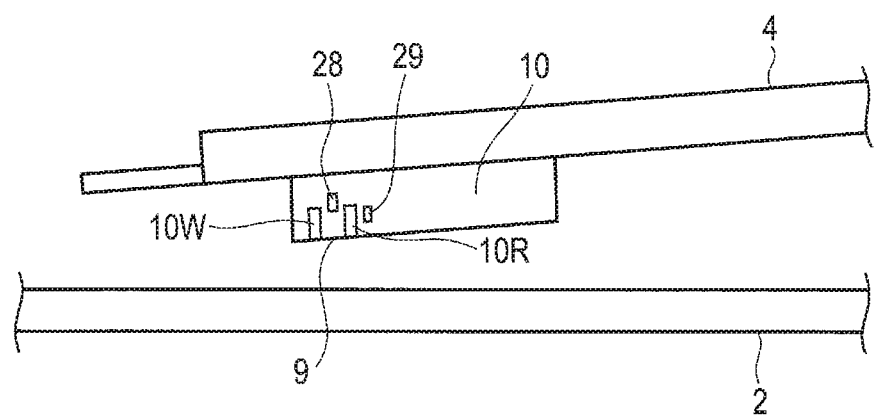
FIG. 3B illustrates adjustment of a floating degree of the magnetic head of the first embodiment.

Now, with reference to FIG. 3A and FIG. 3B, the adjustment of the floating degree of the first and second heaters 28 and 29 will be explained. FIG. 3A is a schematic view of the floating degree of the head while the first and second heaters 28 and 29 are turned on. FIG. 3B is a schematic view of the floating degree of the head while the first and second heaters 28 and 29 are turned off (or a state where current is supplied lower than that in a normal recording/resuming operation).

As in FIG. 3A, when the power is supplied to the first and second heaters 28 and 29 (turned on) while the magnetic head 10 is floating, the magnetic head 10 is heated, and the ABS 9 projects to the surface side of the magnetic disk 2. Thus, the floating degree of the magnetic head 10 becomes small (decreases), that is, a gap between the surface of the magnetic disk 2 and the ABS 9 becomes small, specifically, becomes 1 nm, for example. By decreasing the floating degree, recording/resuming of the data by the magnetic head 10 to/from the magnetic disk 2 can be performed suitably. At the same time, a high frequency magnetic field from the STO 100 is sufficiently applied to the magnetic disk 2, and a high frequency assist effect can be achieved.

As in FIG. 3B, when the power is not supplied to the first and second heaters 28 and 29 (turned off), the ABS 9 of the magnetic head 10 does not expand to the magnetic disk 2 side and is maintained substantially flat. Thus, the floating degree of the magnetic head 10 becomes greater, and a gap between the surface of the magnetic disk 2 and the ABS 9 becomes, for example, 10 nm. In such a high floating state, the gap between the STO 100 and the magnetic disk 2 is greater, and thus, the high frequency magnetic field oscillated from the STO 100 does not substantially work on the magnetic disk 2, and the assist effect is not achieved.

Figure 4:
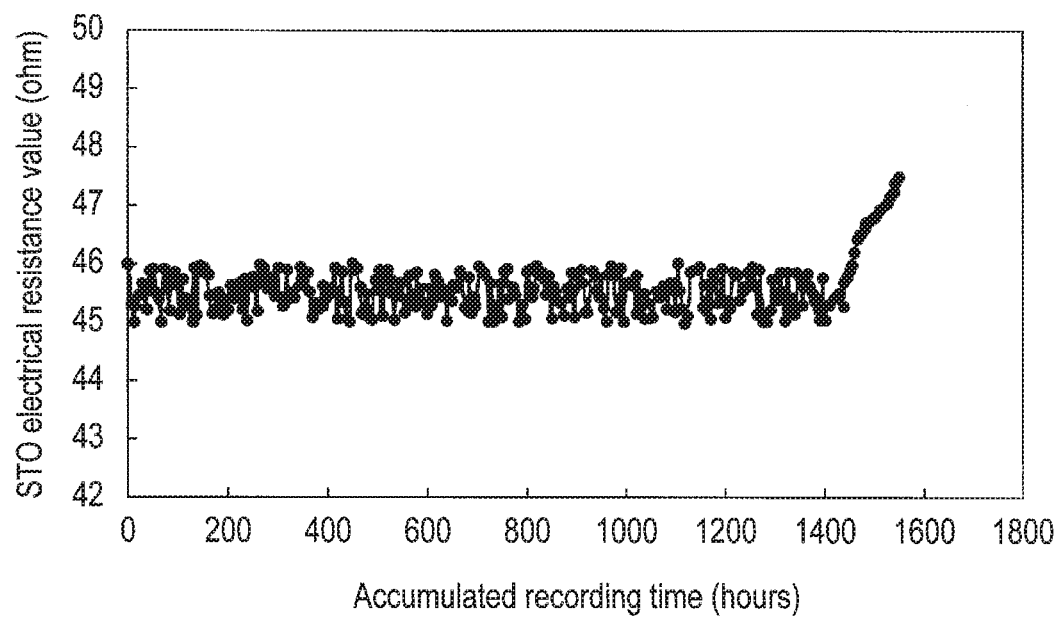
FIG. 4 illustrates an example of time line data of the electrical resistance value of the first embodiment.
Figure 5:
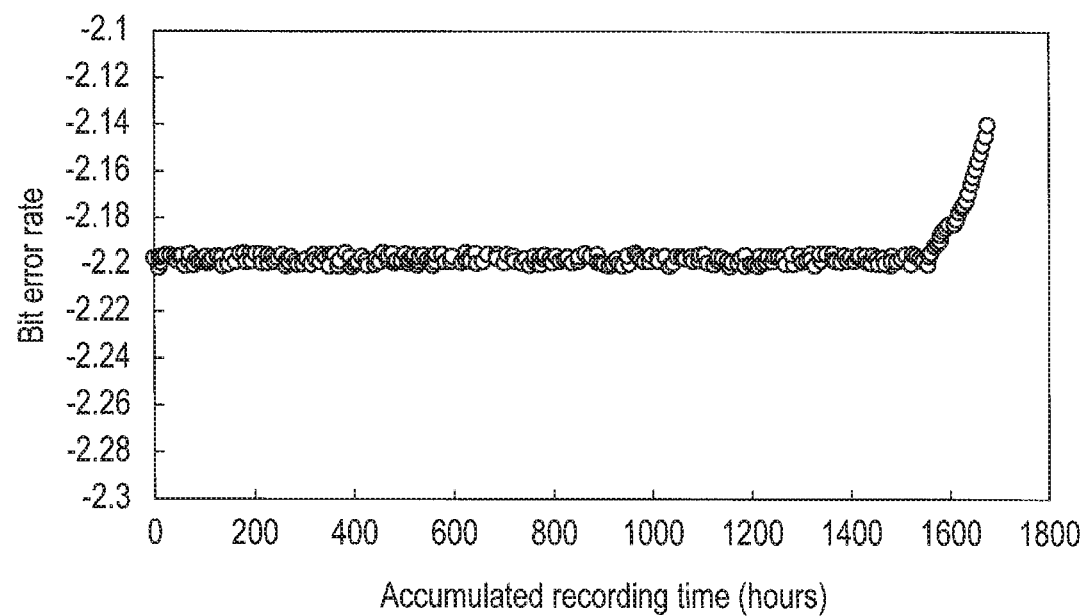
FIG. 5 illustrates an example of a result of measurement of bit error rate of the first embodiment.

FIGS. 4 and 5 illustrate examples of results detected by the detection part 141 in the magnetic disk device 1. Specifically, the detection part 141 detects the electrical resistance value of the STO 100 by applying an inspection low voltage to the head amplifier IC 11 once per hour. Furthermore, the detection part 141 detects a bit error rate at the time of detecting the electrical resistance value of the STO 100.

FIG. 4 illustrates an example of time line data of the electrical resistance value detected by the detection part 141. In FIG. 4, the horizontal axis is a recording accumulation time and the vertical axis is the electrical resistance value of the STO 100. FIG. 4 illustrates changings of the electrical resistance value of the STO 100 from the initial value. Furthermore, FIG. 5 illustrates an example of a result of measurement of bit error rate. In FIG. 5, the horizontal axis is a recording accumulation time, and the vertical axis is the bit error rate. The recording accumulation time corresponds to the recording accumulation time of FIG. 4. From both figures, changings of the electrical resistance value of the STO 100 and changings of the bit error rate can be compared from the initial value of the recording accumulation time through the time. As in FIGS. 4 and 5, the changing of electrical resistance of the STO 100 is detected first, and then, after a certain period of time passes as shown, there will be a changing in the bit error rate. Specifically, a change of the electrical resistance value occurs after 1400 time, and a change of the bit error rate occurs before 1600 time. In both the electrical resistance value of the STO 100 and the bit error rate, when there is a change, the electrical resistance value increases more as time goes by in the STO 100, and the error rate increases more as time goes by in the bit error rate.

Here, a threshold value RT1 (first threshold value) is set in the electrical resistance value. The threshold value RT1 is an electrical resistance value which defines a deterioration condition before the electrical resistance value increases too much and the performance of the STO 100 deteriorates significantly. Note that the threshold value RT1 is stored in the memory 16. That is, if a bias voltage Vb is kept being applied to the STO 100 even after the electrical resistance value exceeds the threshold value RT1, as in FIG. 4, the change of the electrical resistance value, that is, the deterioration of the STO 100 is accelerated. However, by decreasing the bias voltage Vb, the inclination thereof (that is, progress of the deterioration) can be decreased, and furthermore, by stopping the application of the bias voltage Vb, the deterioration of the electrical resistance value of the STO 100 can be stopped.

Figure 6:
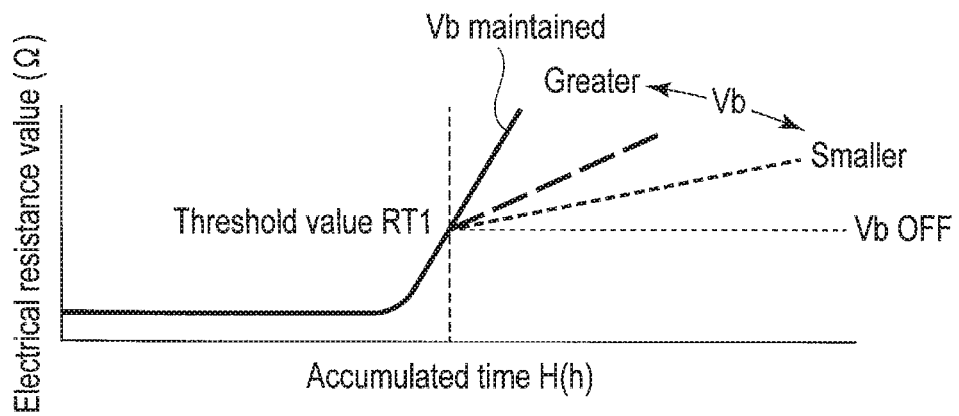
FIG. 6 illustrates an example of a change in the electrical resistance value of the first embodiment.

FIG. 6 illustrates an example of a change in the electrical resistance value when the bias voltage Vb applied to the STO 100 is changed at the threshold value RT1. In FIG. 6, the horizontal axis is the time, and the vertical axis is the electrical resistance value. Furthermore, in this example, the bias voltage Vb applied to the STO 100 is changed at the accumulation time H(h). While the bias voltage Vb is maintained, the electrical resistance value of the STO 100 detected by the detection part 141 increases, and when the bias voltage Vb is decreased, the speed of the increase of the electrical resistance value becomes small, and when the bias voltage Vb is turned off, the change of the electrical resistance value can be stopped. The application of the bias voltage Vb is stopped only for the magnetic head 10 which is a target to prevent the deterioration of the STO 100 to continue the recoding operation of the magnetic disk device 1.

As above, in a case where the bias voltage Vb applied to the STO 100 is decreased, the oscillation performance of the STO 100 decreases, or stops, and the bit error rate at the time of recording the data is deteriorated. Thus, in the magnetic disk device 1 of the present embodiment, the MPU 14 changes the recording condition of the magnetic head 10 based on the threshold value RT1. Specifically, the MPU 14 performs a process to decrease the floating degree of the magnetic head 10, that is, a process to decrease spacing between the floating surface of the magnetic head 10 and the recording surface of the magnetic disk 2. The process will be explained in the following section.

Figure 7:
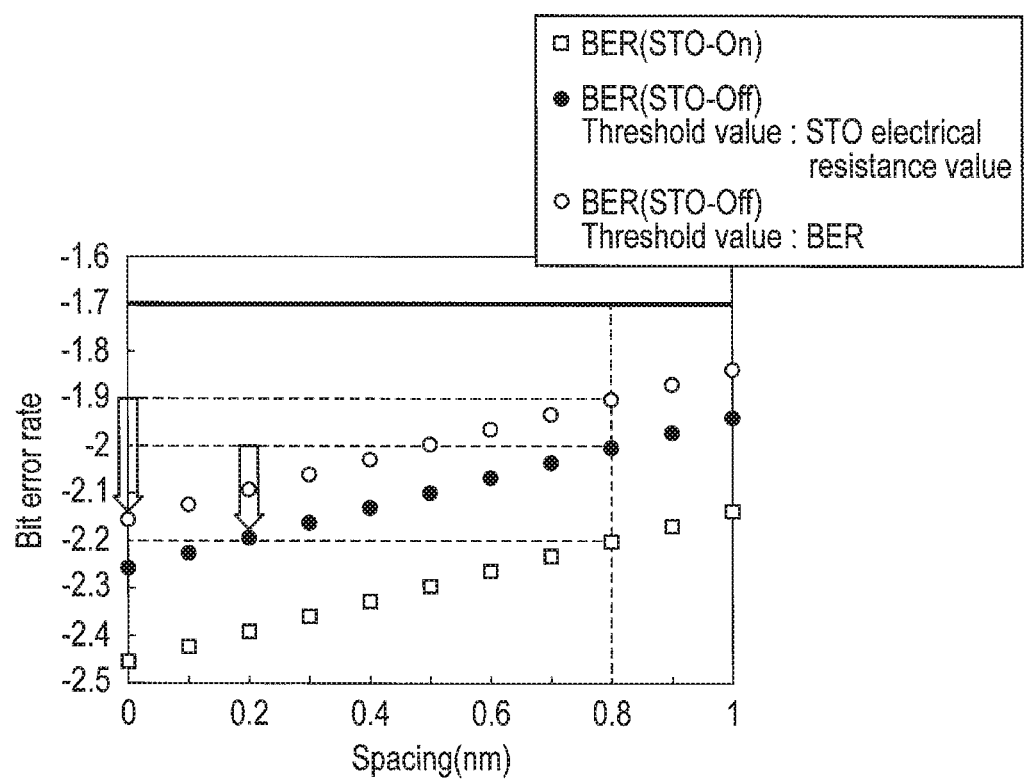
FIG. 7 illustrates an example of a relationship map between bit error rate and spacing of the first embodiment.

FIG. 7 illustrates an example of a relationship map of the bit error rate with respect to spacing. The map is stored in the memory 16. In FIG. 7, the horizontal axis is spacing and the vertical axis is bit error rate. Furthermore, in FIG. 7, a square indicates a bit error rate in a case where a bias voltage is applied (STO-On), a black circle indicates a bit error rate in a case where the threshold value is set in the electrical resistance value of the STO 100 and a bias voltage is not applied (STO-Off), and a white circle is a bit error rate in a case where a threshold value is set in the bit error rate and a bias voltage is not applied (STO-Off). As in FIG. 7, when a difference between the bias voltages of the STO 100 in the On/Off states is smaller, it is easier to cover the deterioration in the bit error rate with lower decrease in the spacing.

Furthermore, if the threshold value is set in the change of the electrical resistance value of the STO 100, spacing is changed from 0.8 to 0.2 nm in order to improve the bit error rate to its initial value. On the other hand, if the threshold value is set in the change of the bit error rate, which is monitored at the same time, the bit error rate does not reach its initial value even if the spacing is changed from 0.8 to 0.0 nm. Thus, in the determination of the deterioration of the STO 100, the threshold value should be set in the electrical resistance value of the STO 100. Furthermore, a decrease in the spacing which is required in order to maintain the read/write quality can be estimated from a relationship between the bit error rate and the spacing.

Figure 8:
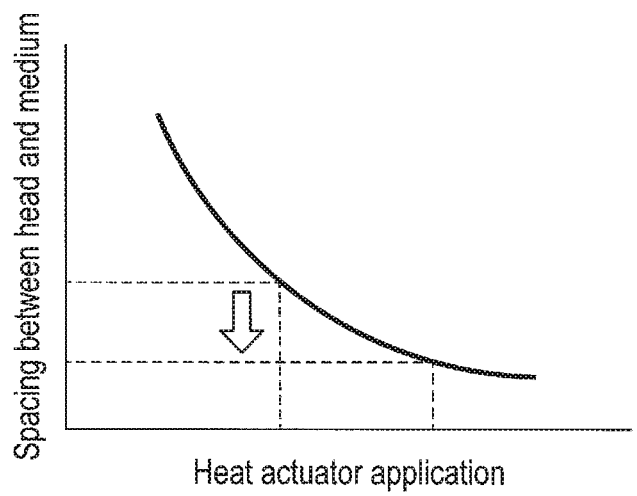
FIG. 8 illustrates an example of a relationship map between application of a thermal actuator and spacing between a head and a medium of the first embodiment.

FIG. 8 illustrates an example of a relationship map between application of the first and second heaters 28 and 29 (thermal actuator) and spacing between the magnetic head 10 and the recording surface of the magnetic disk 2 (between head and medium) while the bias voltage Vb of the STO 100 is stopped. The map is stored in the memory 16.

With the relationship map of FIG. 8, the adjustment part 143 can readjust the application of the first and second heaters 28 and 29 (thermal actuator), that is, the floating degree of the magnetic head 10 to be 0.2 nm while the bias voltage Vb of the STO 100 is stopped. Here, the adjustment part 143 can use a third harmonic method in which an amplitude of third harmonic component is detected, and a change in a ratio of first component and third component is used to derive spacing. Furthermore, the adjustment part 143 can derive spacing from a change in the amplitude of the first component. After the floating degree of the magnetic head 10 is readjusted, a long running test was performed, and as a result, there was no anomaly such that the read/write performance of the magnetic disk device 1 is deteriorated even after 3000 h.

From the above result, the determination part 142 of the magnetic disk device 1 provides the threshold value RT1 of the electrical resistance value of the STO 100 with the memory 16. Then, the magnetic disk device 1 detects the electrical resistance value of the STO 100 by the detection part 141, and if the detected electrical resistance value is determined to be above the threshold value RT1 by the determination part 142, changes the recording condition to decrease the floating degree of the magnetic head 10 with respect to the recording surface of the magnetic disk 2. Thus, the magnetic disk device 1 can suppress the progress of deterioration of the STO 100 used in the assist function, maintains the read/write performance, and can be used continuously. Therefore, the life of the magnetic disk device 1 can be elongated.

Second Embodiment

In the second embodiment, the assist effect of the STO 100 is greater than that of the first embodiment, and in this respect, the second embodiment is different from the first embodiment. Thus, a process performed in a case where the assist effect of the STO 100 is greater will be explained. Note that the elements same as those of the first embodiment will be referred to by the same reference numbers, and the detailed description thereof will be omitted.

The bias voltage Vb of the STO 100 is set as 1.3 times as that of the first embodiment. Thus, the assist effect of the STO 100 increases while a load to the STO 100 increases.

Figure 9:
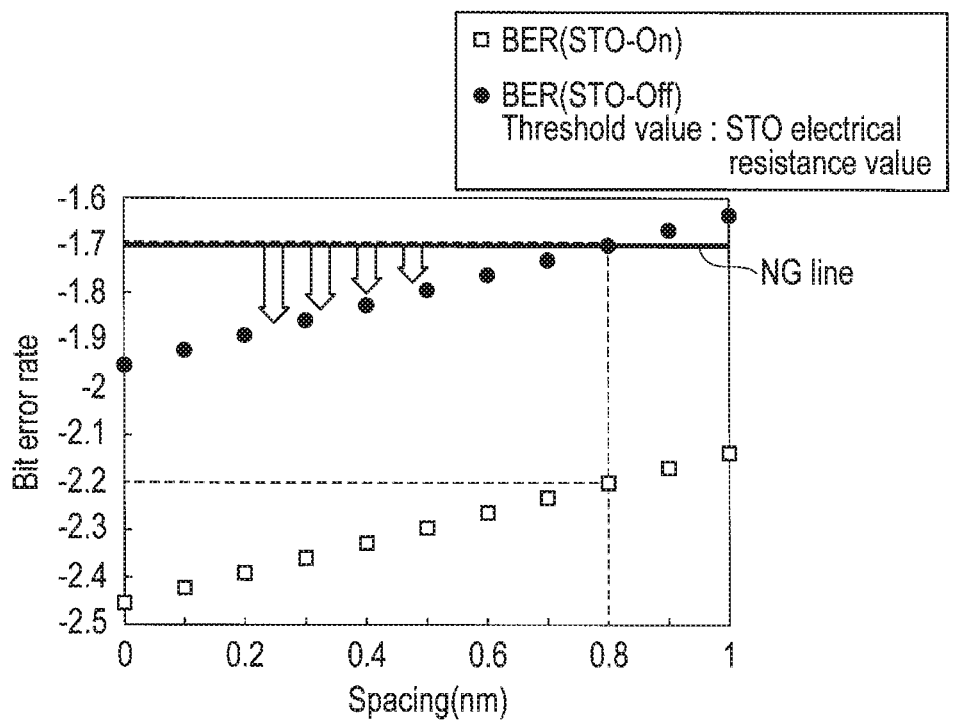
FIG. 9 illustrates an example of a relationship map between a bit error rate and spacing of a second embodiment.

FIG. 9 illustrates an example of a relationship map between the bit error rate with respect to the spacing where the bias voltage Vb of the STO 100 is set to 1.3 times as that of the first embodiment. The relationship map is stored in the memory 16. In FIG. 9, the horizontal axis is the spacing and the vertical axis is the bit error rate. Furthermore, in FIG. 9, a square indicates a bit error rate where the bias voltage is applied (STO-On), a black circle indicates a bit error rate where the threshold value is set in the electrical resistance value of the STO 100 and the bias voltage is not applied (STO-Off). Furthermore, an NG line is a line defining a limit of deterioration of the bit error rate.

FIG. 9 indicates a result where the detection part 141 detects the electrical resistance value of the STO 100, and the determination part 142 determines that the detected electrical resistance value is above the threshold value RT1, and at that time, the adjustment part 143 stops the application of bias voltage Vb to the target magnetic head 10 alone, and the recording operation of the magnetic disk device 1 is continued. As in FIG. 9, as compared to the case of the first embodiment shown in FIG. 7, a difference between the applied bias voltages Vb of the STO 100 in the on/off states is great, and even if the spacing is set to 0.0, the initial bit error rate (−2.2) is not achievable.

Now, the adjustment part 143 calculates spacing which satisfies a desired life target based on a relationship between the spacing and the life of the magnetic head 10. FIG. 10 indicates an example of a relationship map between the life of the magnetic head 10 and the head-medium spacing (first relationship map). The relationship map is stored in the memory 16.

In FIG. 10, the horizontal axis indicates spacing between the magnetic head 10 and the recording surface of the magnetic disk 2 (between head and medium), and the vertical axis indicates the life of the magnetic head 10 (life of head). In a case where the determination part 142 determines that the electrical resistance value of the STO 100 is above the threshold value RT1, if the bit error rate cannot reach its initial value even if the adjustment part 143 set the spacing to 0.0 nm, the adjustment part 143 refers to FIG. 10 and calculates spacing based on a desired head life. The desired head life can be set optionally, and the life period is stored in the memory 16. After calculating the spacing, the adjustment part 143 refers to FIG. 9, and calculates spacing which satisfies the calculated spacing and by which the bit error rate is below the NG line. The adjustment part 143 adjusts the floating degree of the magnetic head 10 to the calculated spacing, and thus, the life of the magnetic head 10, and also the life of the magnetic disk device 1 can be elongated, and the downtime of the system can be suppressed.

Third Embodiment

In the third embodiment, the determination by the determination part 142 is performed in two steps, and in this respect, the third embodiment is different from the first embodiment. Thus, a process according to the determination performed by the determination part 142 in two steps will be explained. Note that the elements same as those of the first embodiment will be referred to by the same reference numbers, and the detailed description thereof will be omitted.

FIG. 11 illustrates two-step thresholds. Note that the above-mentioned explanation with respect to FIG. 4 basically applies the same in this example except for two threshold values RT11 and RT12. After the recording accumulation time pasts 1400 h, and the electrical resistance value of the STO 100 which has been stable begins increasing, the threshold value RT11 is set, and the threshold value RT12 is set to the electrical resistance value which is greater than the threshold value RT11. That is, the threshold value RT12 is a threshold value to define that the STO 100 is further deteriorated after the electrical resistance value of the STO 100 exceeds the threshold value RT11. The threshold values RT11 and RT12 are stored in the memory 16. The threshold value RT11 may be set as the aforementioned threshold value RT1.

If the determination part 142 determines that the electrical resistance value of the STO 100 detected by the detection part 141 exceeds the threshold value RT11, the adjustment part 143 decreases the bias voltage Vb of the target magnetic head 10 alone. The adjustment part 143 adjusts the decrease of applied bias voltage Vb based on the relationship map between the bit error rate and the bias voltage. The relationship map is stored in the memory 16.

Figure 12:
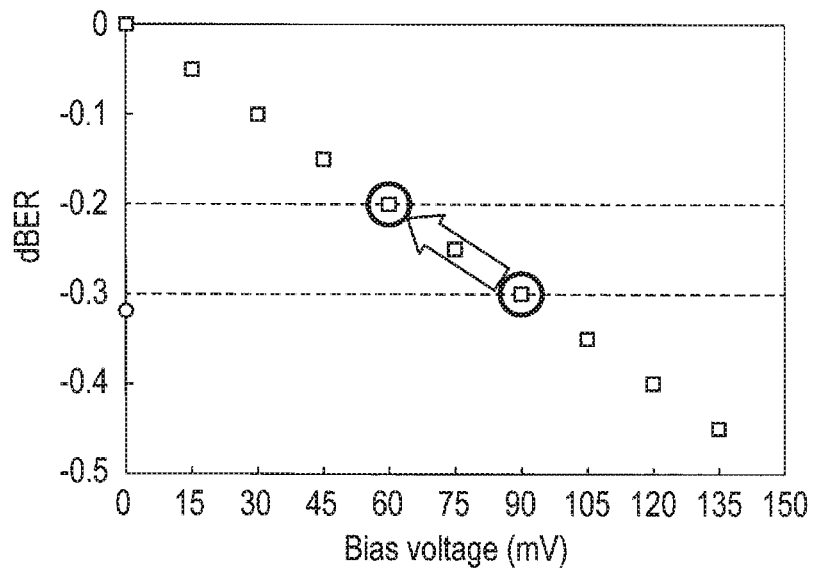
FIG. 12 illustrates an example of a relationship map between a delta bit error rate and a bias voltage of the third embodiment.

FIG. 12 illustrates an example of a relationship map between a delta bit error rate and a bias voltage. The horizontal axis indicates the bias voltage, and the vertical axis indicates the delta bit error rate. As in FIG. 12, the determination part 142 decreases the bias voltage applied to the STO 100 from 90 to 60 mV, the delta bit error rate is deteriorated from −0.3 to −0.2. The adjustment part 143 compensates the deteriorated bit error rate by changing the recording condition, that is, decreasing the spacing.

The adjustment part 143 calculates, as in the first embodiment, a degree of decrease of the spacing required to maintain the read/write quality based on a relationship between the bit error rate and the spacing. In the present embodiment, the adjustment part 143 calculates the decreasing floating degree as 0.45 nm, and adjusts the floating degree from 0.8 to 0.45 nm. As above, the change of the recording condition if the bit error rate is above the threshold value RT11 is performed by the adjustment part 143. The MPU 14 performs the data recording operation while the bias voltage Vb is turned on.

Then, if the determination part 142 determines that the rate is above the threshold value RT12, as in the first and second embodiment, the application of bias voltage Vb of the STO 100 of the target magnetic head 10 is stopped, and furthermore, the adjustment part 143 calculates the floating degree of the magnetic head 10 and adjusts the voltage applied to the heaters 28 and 29 such that the magnetic head 10 is positioned to the calculated floating degree. Thus, the magnetic disk device 1 can prevent the deterioration of the STO 100 and can adjust the bit error rate in step-by-step.

Fourth Embodiment

In the fourth embodiment, the detection part 141 monitors, in addition to the electrical resistance value of the STO 100, a change in the bit error rate, and in this respect, the fourth embodiment is different from the first embodiment. Thus, a process to monitor a change in the bit error rate by the detection part 141 will be explained. Note that the elements same as those of the first embodiment will be referred to by the same reference numbers, and the detailed description thereof will be omitted.

The determination part 142 determines the electrical resistance value of the STO 100 detected by the detection part 141 based on the aforementioned threshold values RT1, or RT11 and RT12, and determines a change of the bit error rate based on a threshold value BT1 and a threshold value BT2 which is different from the threshold value BT1. The threshold value BT1 is a threshold value to define a first condition where the bit error rate is deteriorated, and the threshold value BT2 is a threshold value to define the bit error rate is further deteriorated as compared to the condition of the threshold value BT1. As above, the determination part 142 performs two-step determination of a change of the bit error rate.

Figure 13:
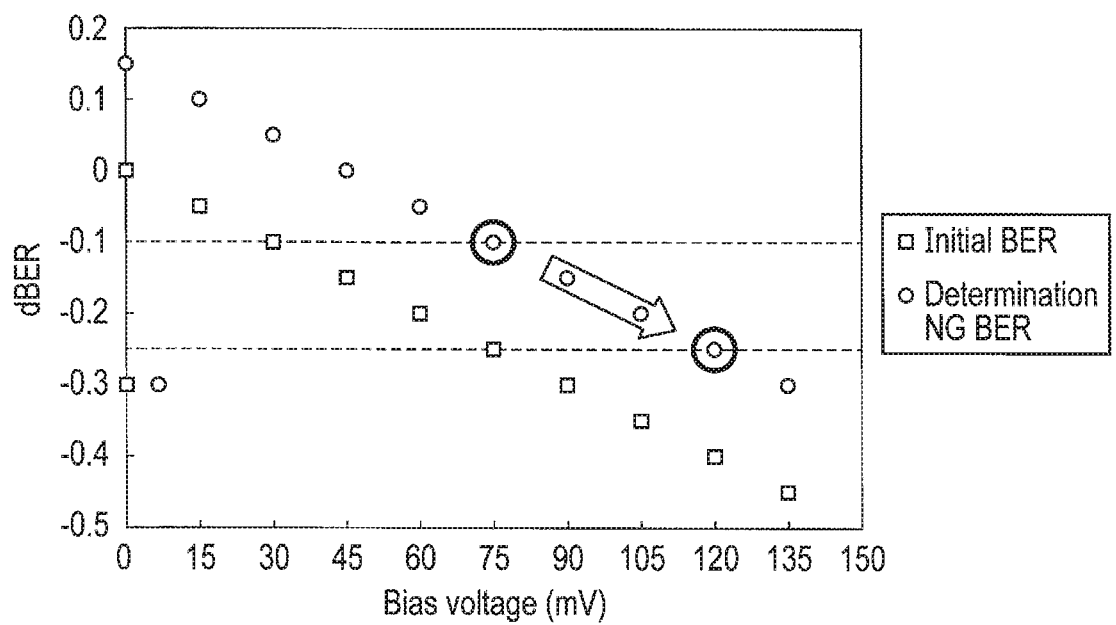
FIG. 13 illustrates an example of a relationship map between a delta bit error rate and a bias voltage of a fourth embodiment.

FIGS. 13 to 15 illustrate a process of the present embodiment. FIG. 13 illustrates an example of a relationship map (a second relation map) between a bit error rate and a bias voltage Vb. FIG. 14 illustrates a relationship map between a life of a head and application of the bias voltage Vb. FIG. 15 is a timing chart indicating an example of timing to adjust an electrical resistance value, bit error rate, bias voltage Vb, and floating degree. Note that the relationship map shown in FIGS. 13 and 14 is stored in the memory 16.

In the present embodiment, a case where there is no change in the electrical resistance value of the STO 100. In that case, if the determination part 142 determines that the deterioration of the bit error rate is above the threshold value BT1, the adjustment part 143 decreases the floating degree of the target magnetic head 10 alone. The adjustment part 143 calculates, as in the first embodiment, a degree of decrease of spacing required to maintain the read/write quality from a relationship between the bit error rate and the spacing shown in FIG. 7.

In the present embodiment, since there is no change in the electrical resistance value of the STO 100, an influence to the life of the magnetic head 10 by continuing the bias voltage Vb of the STO 100 is small. Thus, the magnetic disk device 1 continues the recording operation by readjusting the floating degree of the magnetic head 10 while maintaining the application of the bias voltage Vb by the adjustment part 143.

During the continued recording operation, if the bit error rate detected by the detection part 141 is further deteriorated, and if the determination part 142 determines that the deterioration of the bit error rate is above the threshold value BT2, the adjustment part 143 increases the bias voltage Vb of the target magnetic head 10. With the increase of the bias voltage Vb, the oscillation of the STO 100 can be improved. Thus, the deterioration of the bit error rate can be compensated, and the read/write characteristics of the magnetic disk device 1 can be maintained.

The adjustment part 143 can calculate a value to increase of the bias voltage Vb of the target magnetic head 10 from a relationship map between the bit error rate and the bias voltage shown in FIG. 13. In the present embodiment, the adjustment part 143 adjusts the boas voltage Vb from 75 to 120 mV in order to compensate the deterioration of the bit error rate. After the bias voltage Vb is adjusted as above, the magnetic disk device 1 continues the recording operation while the floating degree is maintained as the readjusted degree.

When the recording operation is continued, since the application of the bias voltage Vb is increased, the STO 100 tends to be easily deteriorated. Thus, the adjustment part 143 adjusts the application such that it satisfies a desired life and becomes below the NG line of the bit error rate (cf., FIG. 9)

at a certain time based on the relationship map between the bias voltage application and the life of the head shown in FIG. 14. Here, the certain time is after the adjustment of FIG. 13 based on the relationship map.

Note that, in the present embodiment, when the deterioration of the bit error rate exceeds the threshold value BT1, the magnetic disk device 1 initially adjusts the floating degree of the magnetic head 10, and then, when the deterioration exceeds the threshold value BT2, adjusts the application of bias voltage of the STO 100. However, if the oscillation of the STO 100 is great, or if adjustment of the floating degree of the magnetic head 10 cannot be prioritized, the magnetic disk device 1 may initially adjust the application of the bias voltage Vb of the STO 100, and may adjust the floating degree of the magnetic head 10 later. Or, the magnetic disk device 1 may adjust the both in parallel. In either case, the magnetic disk device 1 can adjust the floating degree and the application of the bias voltage Vb, and can compensate the deterioration of the bit error rate, and thus, can maintain the read/write characteristics, and can prevent abnormalities.

Fifth Embodiment

In the fifth embodiment, the detection part 141 monitors, in addition to the electrical resistance value of the STO 100, a change in the bit error rate, as in the fourth embodiment; however, timing of adjusting the floating degree and the application of the bias voltage Vb is different from that of the fourth embodiment. Thus, a process of adjusting the floating degree and the application of the bias voltage Vb by the adjustment part 143 will be explained. Note that the elements same as those of the first embodiment will be referred to by the same reference numbers, and the detailed description thereof will be omitted.

Figure 16:
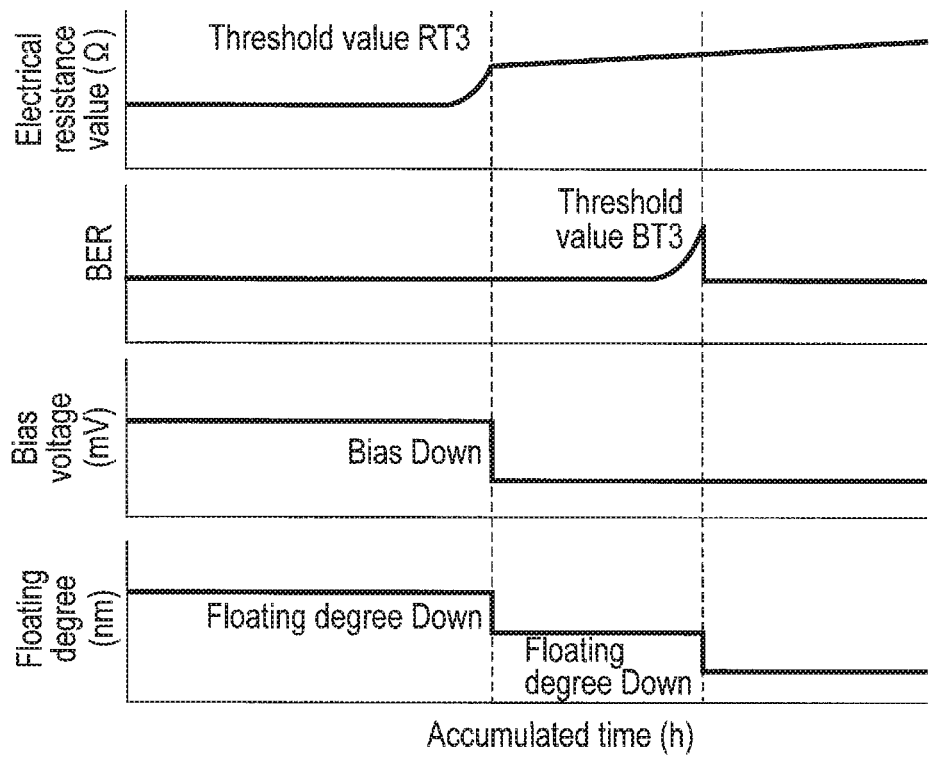
FIG. 16 is a timing chart of an example of timing of a fifth embodiment.

FIG. 16 is a timing chart indicating an example of timing to adjust an electrical resistance value, bit error rate, bias voltage Vb, and floating degree. A threshold value RT3 is a threshold value to define that the electrical resistance value is deteriorated, and a threshold value BT3 is a threshold value to define the deterioration of the bit error rate. Note that the threshold values RT3 and BT3 are stored in the memory 16.

As in FIG. 16, if the electrical resistance value of the STO 100 detected by the detection part 141 is determined to be above the threshold value RT3 by the determination part 142 while there is no deterioration in the bit error rate, as in the aforementioned third embodiment, the adjustment part 143 adjusts the application of the bias voltage Vb of the target magnetic head 10 and the floating degree of the magnetic head 10. Thus, the deterioration of the electrical resistance value of the STO 100 can be suppressed. Then, the magnetic disk device 1 continues the recording operation.

In that condition, if the determination part 142 determines that the bit error rate exceeds the threshold value BT3, the adjustment part 143 further decreases the floating degree of the magnetic head 10 while maintaining the application of the bias voltage Vb. Thus, the deterioration of the bit error rate can be suppressed. Then, the magnetic disk device 1 continues the recording operation.

Through the above process, the magnetic disk device 1 can maintain the read/write characteristics, and prevent abnormalities. Note that, the readjustment of the application of the bias voltage Vb and the floating degree of the magnetic head 10 by the adjustment part 143 is performed, as in the first to fourth embodiments, by referring to the relationship map with the bit error rate, within a range which satisfies a desired life target based on the relationship map with respect to the magnetic head 10.

Sixth Embodiment

In the sixth embodiment, the detection part 141 monitors, in addition to the electrical resistance value of the STO 100, a change in the bit error rate, as in the fourth and fifth embodiments; however, timing of adjusting the floating degree and the application of the bias voltage Vb is different from that of these embodiments. Thus, a process of adjusting the floating degree and the application of the bias voltage Vb by the adjustment part 143 will be explained. Note that the elements same as those of the first embodiment will be referred to by the same reference numbers, and the detailed description thereof will be omitted.

Figure 17:
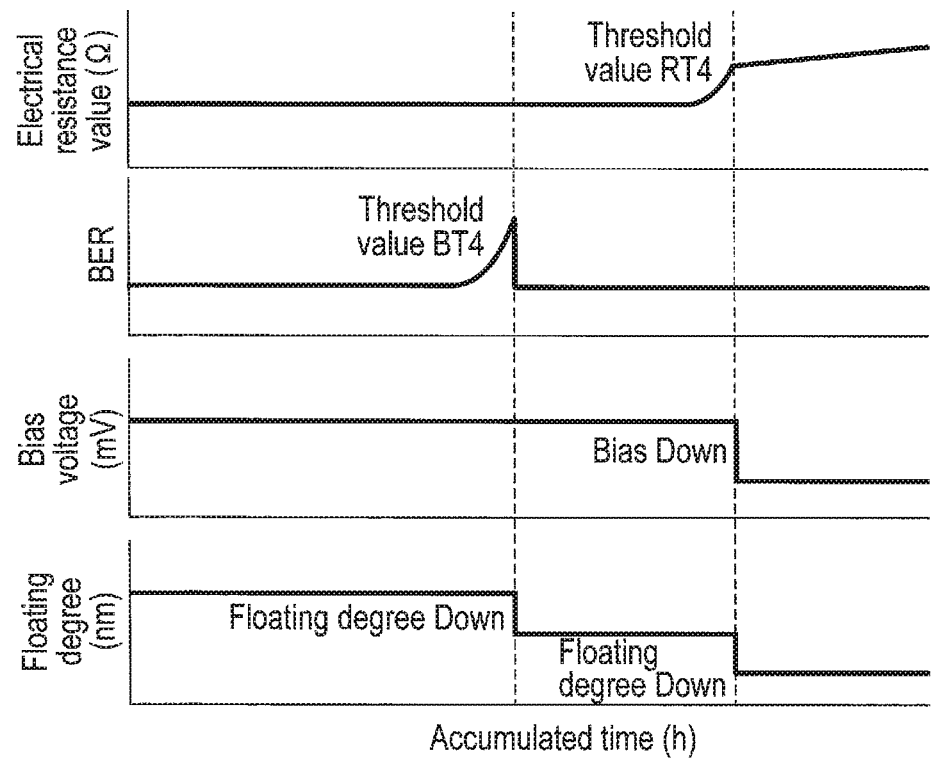
FIG. 17 is a timing chart of an example of timing of a sixth embodiment.

FIG. 17 is a timing chart indicating an example of timing to adjust an electrical resistance value, bit error rate, bias voltage Vb, and floating degree. A threshold value RT4 is a threshold value to define that the electrical resistance value is deteriorated, and a threshold value BT4 is a threshold value to define the deterioration of the bit error rate. The threshold values RT4 and BT4 are stored in the memory 16.

As in FIG. 17, if the bit error rate is determined to be above the threshold value BT4 by the determination part 142 while there is no deterioration in the bit error rate, as in the aforementioned fourth embodiment, the adjustment part 143 decreases the floating degree of the target magnetic head 10 and maintains the application of the bias voltage Vb. Thus, the deterioration of the bit error rate can be suppressed. Then, the magnetic disk device 1 continues the recording operation.

In that condition, if the determination part 142 determines that the electrical resistance value exceeds the threshold value RT4, the adjustment part 143 further decreases the application of the bias voltage Vb of the target magnetic head 10 and further decreases the floating degree of the magnetic head 10. Thus, the deterioration of the electrical resistance value of the STO 100 can be suppressed. Then, the magnetic disk device 1 continues the recording operation.

Through the above process, the magnetic disk device 1 can maintain the read/write characteristics, and prevent abnormalities. Note that, the readjustment of the application of the bias voltage Vb and the floating degree of the magnetic head 10 by the adjustment part 143 is performed, as in the first to fifth embodiments, by referring to the relationship map with the bit error rate, within a range which satisfies a desired life target based on the relationship map with respect to the magnetic head 10.

Seventh Embodiment

In the seventh embodiment, the detection part 141 monitors, in addition to the electrical resistance value of the STO 100 and the change of the bit error rate, a time of application of bias voltage Vb of each magnetic head 10, that is, an accumulated time of write with the bias voltage Vb turned on, and in this respect, the seventh embodiment is different from the aforementioned embodiments. Thus, a process to write with the bias voltage Vb turned on will be explained. Note that the elements same as those of the first embodiment will be referred to by the same reference numbers, and the detailed description thereof will be omitted.

Figure 18:
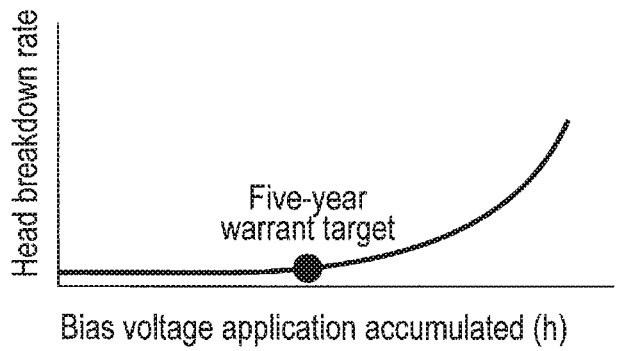
FIG. 18 illustrates an example of a relationship map between a head breakdown rate and a bias voltage application accumulated time of a seventh embodiment.

FIG. 18 illustrates an example of a relationship map between breakdown rate of the magnetic head 10 (head breakdown rate) and a bias voltage application accumulated time (h). The relationship map is stored in the memory 16. As in FIG. 18, the detection part 141 monitors a bias voltage application accumulated time of the magnetic head 10, and if the determination part 142 determines that the head breakdown rate exceeds a five-year warrant target time based on the relationship map of FIG. 18, the adjustment part 143 decreases the application of the bias voltage Vb and the floating degree of the magnetic head 10 regardless of the deterioration of the electrical resistance value of the STO 100. Then, the magnetic disk device 1 continues the recording operation.

After that, if the determination part 142 determines that a change of the electrical resistance value or the bit error rate detected by the detection part 141 exceeds the aforementioned threshold value, as in the first to sixth embodiments, the adjustment part 143 changes the recording condition. Then, the magnetic disk device 1 continues the recording operation. Note that the readjustment of the application of the bias voltage Vb and the floating degree of the magnetic head 10 by the adjustment part 143 is performed, as in the first to sixth embodiments, by referring to the relationship map with the life of the magnetic head 10, within a range which satisfies a desired life target based on the relationship map with respect to the magnetic head 10. Thus, the magnetic disk device 1 can readjust the floating degree of the magnetic head 10 within a range which satisfies a life target.

Eighth Embodiment

In the eighth embodiment, a process related to an element width of the read magnetic head 10R and the write magnetic head 10W of the magnetic head 10 (hereinafter, may be referred to as RW element width) is added, and in this respect, the eighth embodiment is different from the aforementioned embodiments. Thus, a process related to the RW element width will be explained. Note that the elements same as those of the first embodiment will be referred to by the same reference numbers, and the detailed description thereof will be omitted.

Figure 19:
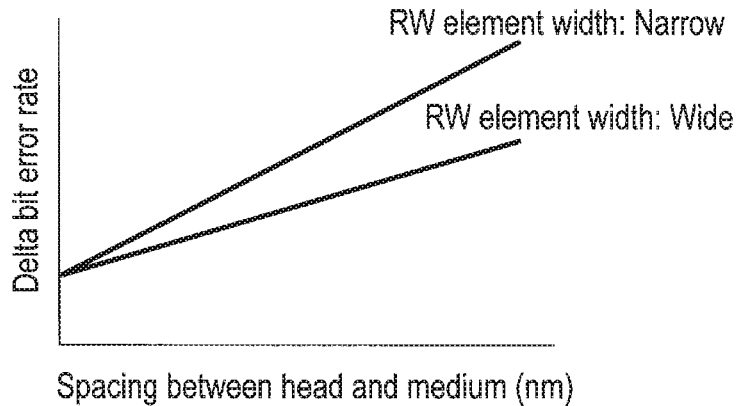
FIG. 19 illustrates an example of a relationship map between a delta bit error rate and a head-medium spacing of an eighth embodiment.

The sensitivity of the delta bit error rate with respect to a change of the spacing between the magnetic head 10 (head) and the magnetic disk 2 (medium) depends on the element width of the read magnetic head 10R and the write magnetic head 10W of the magnetic head 10. Thus, variety according to the head characteristics exists in the magnetic head 10. FIG. 19 illustrates a relationship map between the delta bit error rate and the head-medium spacing. As in FIG. 19, a line representing a narrow RW element width is inclined steeper than a line representing a wide RW element width. Thus, there is variety in the head characteristics corresponding to the RW element widths.

In the present embodiment, while the bias voltage Vb of the STO 100 is applied, a change of the delta bit error rate with respect to a spacing change between two points is preliminarily estimated with respect to each magnetic head 10, and data indicative of a result of estimation are stored in a monitor area (system area) 200 of the magnetic disk 2. Then, as in the first and second embodiments, if the determination part 142 determines that the STO 100 detected by the detection part 141 exceeds the threshold value RT1 (or RT11, RT12), and that the STO 100 is deteriorated, the adjustment part 143 at the time of readjusting the floating degree of the magnetic head 10 refers to the relationship map between the sensitivity of the bit error rate and the head-medium spacing stored in the monitor area 200, and adjusts the floating degree of the magnetic head 10 based on the relationship map to change the recording condition. Thus, the magnetic disk device 1 can calculate an optimal decrease of the floating degree of the target magnetic head 10 in consideration of the variety of the head characteristics of the magnetic head 10.

Ninth Embodiment

In the ninth embodiment, a process related to an element width of the read magnetic head 10R and the write magnetic head 10W of the magnetic head 10 is added as in the eighth embodiment, and in this respect, the ninth embodiment is different from the aforementioned embodiments. Thus, a process related to the RW element width will be explained. Note that the elements same as those of the first embodiment will be referred to by the same reference numbers, and the detailed description thereof will be omitted.

Figure 20:
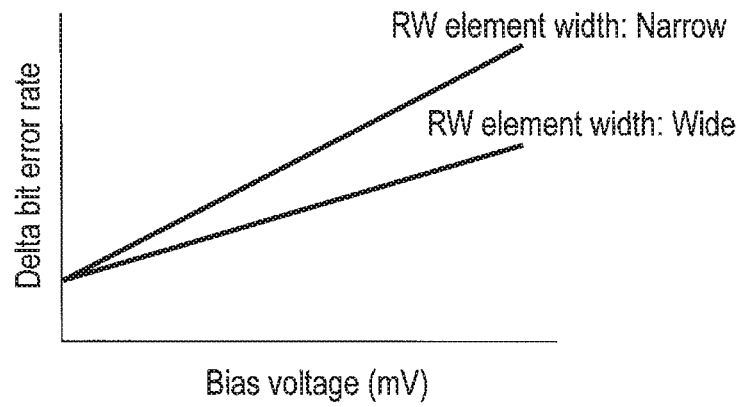
FIG. 20 illustrates an example of a relationship between bit error rate and a bias voltage of a ninth embodiment.

As explained in the eighth embodiment, there are varieties in the head characteristics of the magnetic head 10 depending on the RW element widths. FIG. 20 illustrates an example of a relationship between the delta bit error rate and the bias voltage. As in FIG. 20, a line representing a narrow RW element width is inclined steeper than a line representing a wide RW element width. Thus, there is variety in the head characteristics corresponding to the RW element widths.

In the present embodiment, while the bias voltage Vb of the STO 100 is applied, a change of the bit error rate with respect to an application change between two points of the bias voltage Vb is preliminarily estimated with respect to each magnetic head 10, and data indicative of a result of estimation are stored in a monitor area (system area) 200 of the magnetic disk 2. Then, as in the third to fifth embodiments, if the determination part 142 determines that the electrical resistance value of the STO 100 detected by the detection part 141 exceeds the threshold value, or that the bit error rate is deteriorated above the threshold value, the adjustment part 143 at the time of readjusting the floating degree of the magnetic head 10 refers to the relationship map between the sensitivity of the bit error rate and the bias voltage, and adjusts the floating degree of the magnetic head 10 based on the relationship map to change the recording condition. Thus, the magnetic disk device 1 can calculate an optimal decrease of the floating degree of the target magnetic head 10 in consideration of the variety of the head characteristics of the magnetic head 10.

Tenth Embodiment

In the first to ninth embodiments, an assist function by a high frequency assist type magnetic head (high frequency assist recorder) 10 using the STO 100 is used; however, the assist function is not limited thereto, and a thermal assist type magnetic head (thermal assist recording part) including a near field transducer (NFT) element and a laser diode may be used. In the following description, a magnetic disk device 1 including a thermal assist type magnetic head 10 will be explained. Note that the elements same as those of the first embodiment will be referred to by the same reference numbers, and the detailed description thereof will be omitted.

FIG. 21 illustrates an example of the structure of a magnetic disk device 1 of the present embodiment.

As compared to FIG. 1, FIG. 21 illustrates a laser diode (LD) controller 111a instead of a STO controller 111 in the head amplifier IC 11. Furthermore, the MPU 14 includes a detection part 141a, determination part 142a, and adjustment part 143a. Furthermore, a recording control circuit 18 is added.

The detection part 141a detects a condition of a near field transducer element 156a which will be described later. In the present embodiment, the detection part 141a detects an electrical resistance value of the near field transducer element 156a as a condition thereof. the determination part 142a determines whether or not the a recording condition of data by the magnetic head 10 is changed based on a result of the monitoring of the near field transducer element 156a by the detection part 141a and the threshold value stored in the memory 16. The adjustment part 143a changes the recording condition of data to the magnetic disk 2 of the magnetic head 10 based on the result from the determination part 142a. Processes executed by the detection part 141a, determination part 142a, and adjustment part 143a will be described later.

The recording control circuit 18 is connected to an LD controller 111a in the head amplifier IC 11 and MPU 14, and controls a gain (input/output ratio) of light irradiation part 156 which will be described later in order to maintain the near field light strength.

Now, an example of the structure of the thermal assist type magnetic head 10 will be explained.

FIG. 22 is a cross-sectional view of an example of the structure of the magnetic head 10. As in FIG. 22, the magnetic head 10 can be roughly divided into a resume part 15a configured to read a signal and data written in the magnetic disk 2, and a record part 15b configured to write a signal and data to the magnetic disk 2.

The resume part 15a includes a resume element 151 and two shields 152 and 153. The resume element 151 is disposed between the two shields 152 and 153 in the axis X direction. Furthermore, the resume element 151 is at least partly exposed to the floating surface F through a protection film which is not shown. The resume element 151 is, for example, a tunnelmagneto-resistance (TMR) element, and reads a signal and data read in the magnetic disk 2 by sense current. The two shields 152 and 153 also function as electrodes to supply the sense current to the resume element 151 while functioning as the magnetic shields. A line which is not shown is connected to each of the shields 152 or 153, and a voltage to supply the sense current to the resume element 151 is applied by the head amplifier IC 11. Note that, in the present embodiment, a TMR element is used as the resume element 151; however, it is not limited thereto, and an element which can read the data written to the magnetic disk 2 such as a giantmagneto-resistance (GMR) element can be used.

The record part 15b includes a magnetic core 154, laser diode (light emitter) 155, piezo element 156, magnetic pole position controller 157, radiator 158, and cured member 159.

The magnetic core 154 includes a magnetic yoke 154a, coil 154b, and main magnetic pole 154c. The magnetic yoke 154a is formed of a reading yoke 154a1 and a trailing yoke 154a2 each formed of a highly saturation density material. The reading yoke 154a1 has a substantial reverse F-letter shape in a cross-section of the magnetic head 10 of FIG. 22. The trailing yoke 154a2 has a shape of the substantial reverse F-letter shape of the reading yoke 154a1 rotated 180 degrees around the Y axis. The reading yoke 154a1 and the trailing yoke 154a2 are arranged to be opposed to each other, and are connected together at the center part in the Y axis direction (the part close to the winding center of coil 154b). The tip of the trailing yoke 154a2 in the floating surface F side is exposed on the floating surface F via the protective film. The tip of the trailing yoke 154a2 in the floating surface F side is covered with the piezo element 156 which will be described later. Note that the reading yoke 154a1 and the trailing yoke 154a2 of the present embodiment may be formed of the same material, or may be formed of different materials.

The coil 154b is wound around the center part of the trailing yoke 154a2 in the Y axis direction. The coil 154b is connected to the head amplifier IC 11 via a line which is not shown, and generates a magnetic field from the magnetic yoke 154a with the current output from the head amplifier IC 11. The magnetic field generated by the coil 154b is applied from the main magnetic pole 154c to the recording surface of the magnetic disk 2 substantially perpendicularly.

The main magnetic pole 154c is disposed in the tip positioned in the floating surface F side of the trailing yoke 154a2 in front of the head running direction to be adjacent to the trailing yoke 154a2. The main magnetic pole 154c is expose to the floating surface F via the protection film. The main magnetic pole 154c is formed of a high Bs material unlike the trailing yoke 154a2.

The laser diode (light emitter) 155 includes a light guide path 155a and a light irradiation part 155b. The light guide path 155a is disposed, in the proximity of the floating surface F, between the light irradiation part 155b and the cured member 159 in the X axis direction. Furthermore, the light guide path 155a extends from the proximity of the floating surface F to a +Y direction of FIG. 22 to be connected to a light source, and guides the light supplied from the light source (for example, laser) to the light irradiation part 155b. Note that the end of the light guide path 155a in the floating surface side is disposed to be apart from the floating surface F in the +Y direction.

The light irradiation part 155b is disposed in front of the head running direction with respect to the main magnetic pole 154c in the proximity of the floating surface F. Specifically, the light irradiation part 155b is disposed between the radiator 158 which will be described later, and the light guide path 155a in the X axis direction. The light irradiation part 155b has an opening length of which is equal to or less than a light wavelength supplied from the light source, and forms near field light in the periphery of the opening with the light guided by the light guide path 155a. Then, the light irradiation part 155b locally irradiates the formed near field light to the magnetic disk 2. That is, the light irradiation part 155b generates the near filed light. Thus, write of a signal and data to the magnetic disk 2 using the magnetic field generated by the main magnetic pole 154c can be assisted in the local where the near field light is irradiated. Note that the light guide path 155a is disposed to be apart from the floating surface F to be distant from the magnetic disk 2 (to be recessed with respect to the floating surface F).

The piezo element 156 includes a near field transducer element (piezo element) 156a, two piezo electrodes 156b and 156c, and two piezo terminals 156d and 156e. Two piezo electrodes 156b and 156c are disposed at both ends of the neat field transducer element 156a in the X axis direction functioning as electrodes to apply a voltage to the near field transducer element 156a.

Two piezo terminals 156d and 156e are connected to the electrodes 156b and 156c, respectively, and are connected to the electrode pad in the head amplifier IC 11 via a line which is not shown. With such a structure, the detection part 141a can detect the electrical resistance value of the near field transducer element 156a through the electrode pad of the head amplifier IC 11.

The near field transducer element 156a is disposed on the floating surface F of which longitudinal direction is along the X axis direction. Furthermore, the near field transducer element 156a is disposed behind the head running direction with respect to the main magnetic pole 154c. Note that, in the present embodiment, the near field transducer element 156a is a piezoelectric element. The near field transducer element 156a extends, in accordance with the instruction from the head amplifier IC 11, in its longitudinal direction when a voltage is applied through the piezo electrodes 156b and 156c. As a result, the near field transducer element 156a pushes the main magnetic pole 154c to the head running direction. In other words, the near field transducer element 156a can move the main magnetic pole 154c in a +X direction. That is, the piezo element 156 adjusts a gap between the main magnetic pole 154c and the light irradiation part 155b in the head running direction.

The magnetic pole position controller 157 is disposed between the main magnetic pole 154c and the radiator 158 in the X axis direction in the proximity of the floating surface F. The magnetic pole position controller 157 is formed of $SiO_2$ or $LiAlSiO_4$, and has a negative thermal expansion rate. In the present embodiment, the magnetic pole position controller 157 is contracted by the heat generated around the main magnetic pole 154c at a time of writing of data to the magnetic disk 2; however, the present embodiment is not limited thereto.

The radiator 158 is, in the proximity of the floating surface F, disposed between the magnetic pole position controller 157 and the light irradiation part 155b in the X axis direction. The radiator 158 is formed of a high heat conductive material such as gold (Au) or cupper (Cu), and radiates residual heat from the near field light generated by the light irradiation part 155b, for example.

The cured member 159 is, in the proximity of the floating surface F, disposed in front of the head running direction with respect to the light irradiation part 155b. Furthermore, the cured member 159 extends from the proximity of the floating surface F to the +Y direction in FIG. 2. The cured member 159 is formed of a low thermal expansion material, and when the position of the main magnetic pole 154c is moved in the head running direction by the extension of the near field transducer element 156a, prevents the position of the light irradiation part 155b from changing by being pushed in the head running direction.

Then, the arrangement of the main components of the magnetic head 10 on the floating surface F will be explained. In the magnetic head 10, from the front to the rear of the head running direction of the magnetic head 15 on the floating surface F, a piezo terminal 156d, piezo electrode 156b, near field transducer element 156a, piezo electrode 156c, main magnetic pole 154c, magnetic pole position controller 157, radiator 158, light irradiation part 155b, cured member 159, and reading yoke 154a1 are arranged in this order. Here, the light guide path 155a is disposed between the light irradiation part 155b and the cured member 159; however, the light guide path 155a is recessed on the floating surface F, and it does not appear on the floating surface F.

Figure 23:
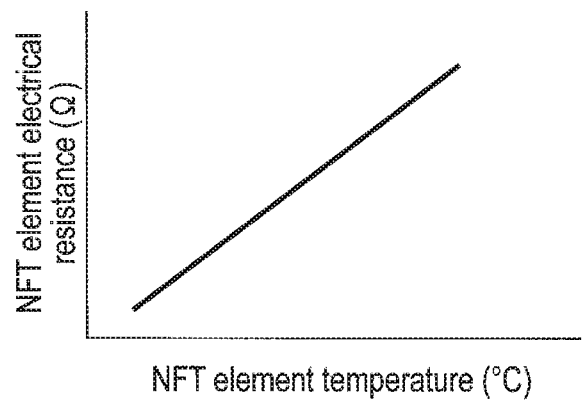
FIG. 23 illustrates an example of a relationship map between an electrical resistance value of a near field transducer element and a near field transducer element temperature of the tenth embodiment.

Now, a process of the magnetic disk device 1 with the above-structured magnetic head 10 will be explained. FIG. 23 illustrates an example of a relationship map of an electrical resistance value of the near field transducer (NFT) element and a near field transducer (NFT) element 156a temperature. The relationship map is stored in the memory 16. As in FIG. 23, when the near field transducer (NFT) element 156a temperature increases, the electrical resistance value of the near field transducer (NFT) element increases accordingly, and thus, there is a proportional relationship therebetween. The detection part 141a can detects the electrical resistance value of the near field transducer element 156a, and thus, the temperature of the near field transducer element 156a can be monitored from the detected electrical resistance value and the relationship map of FIG. 23.

Figure 24:
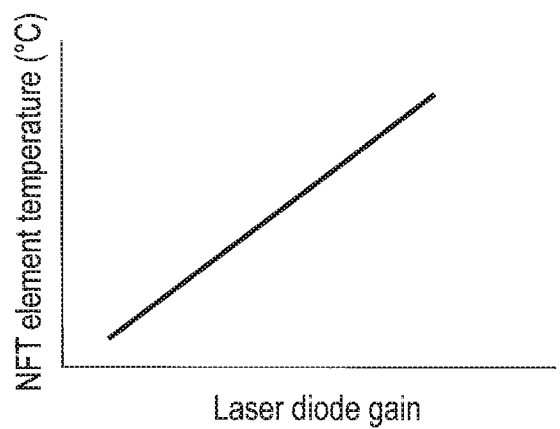
FIG. 24 illustrates an example of a relationship map between a near field transducer element temperature and a gain of a laser diode of the tenth embodiment.

FIG. 24 illustrates an example of a relationship map between a neat field transducer element (NFT element) and a gain of a loser diode 155. The relationship map is stored in the memory 16. When the gain of the laser diode 155 increases, the near field transducer (NET) element temperature increases accordingly, and thus, there is a proportional relationship therebetween. Thus, the detection part 141a can calculate the gain of the laser diode 155 using the near field transducer element temperature and the relationship map of FIG. 24.

Figure 25:
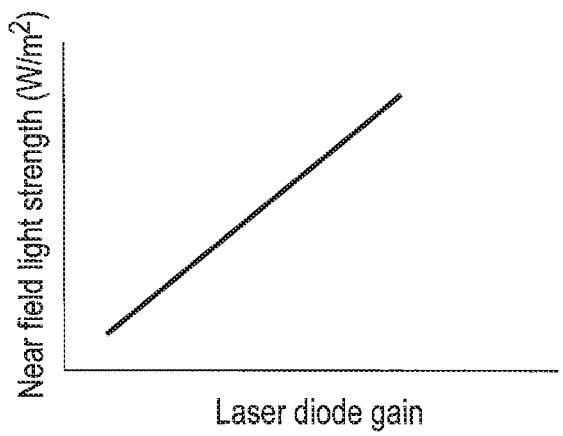
FIG. 25 illustrates an example of a relationship map between a near field light strength and a gain of a laser diode of the tenth embodiment.

FIG. 25 illustrates an example of a relationship map between a near field light strength and a gain of the laser diode 155. The relationship map is stored in the memory 16. When the gain of the laser diode 155 increases, the near field light strength increases, and thus, there is a proportional relationship therebetween.

Figure 26:
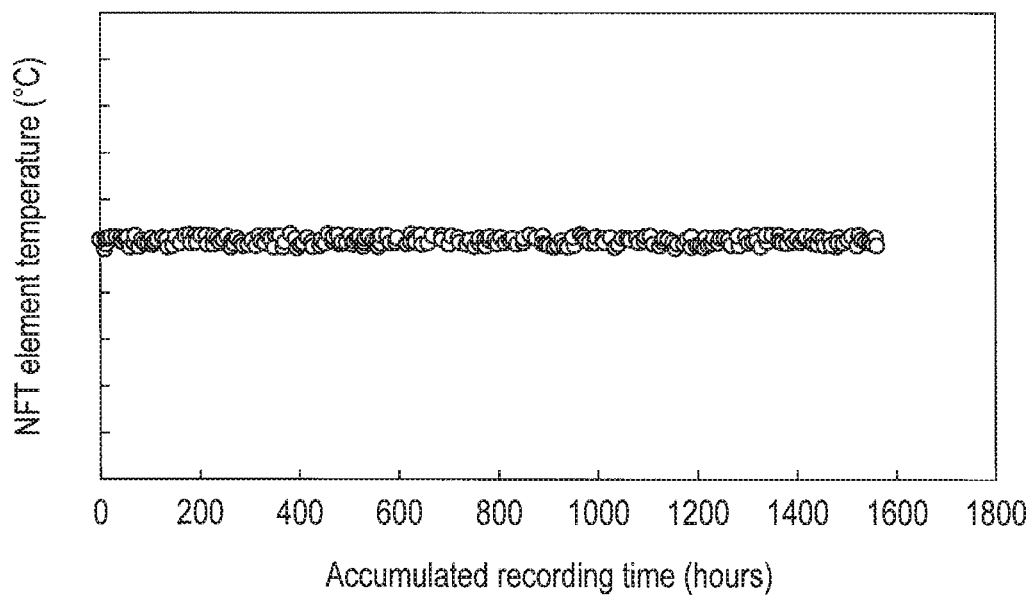
FIG. 26 illustrates an example of a relationship map between a near field transducer element temperature and an accumulated recording time of the tenth embodiment.

The recording control circuit 18 controls, based on the near field transducer element temperature detected by the MPU 14, the LD controller 111a such that the output of the near field transducer element 156a is increased if it is insufficient, and that the output thereof is decreased if it is excessive. By executing the feedback control as above, the magnetic disk device 1 can control the temperature of the near field transducer element 156a to be constant, that is, the assist effect in the data recording to be constant. FIG. 26 illustrates an example of a relationship map between the near field transducer element temperature and the accumulated recording time of the magnetic disk device 1 under the control. As in FIG. 26, the near field transducer element temperature is substantially constant. Thus, the magnetic disk device 1 can continue the stable recording operation of data with the recording control circuit 18.

Figure 27:
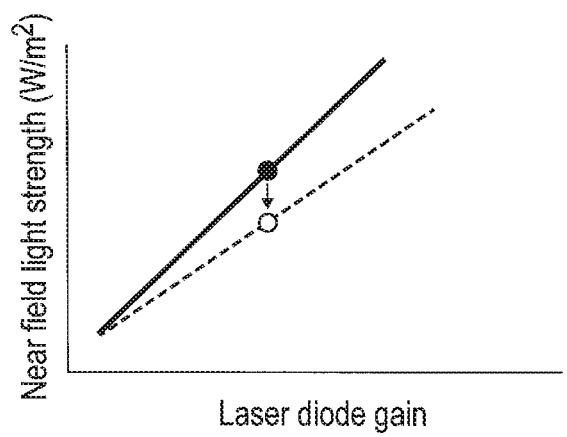
FIG. 27 illustrates a relationship map between a near field light strength and a gain of the laser diode when the near field transducer element is deteriorated in the tenth embodiment.

FIG. 27 illustrates an example of a relationship map between a near field light strength and a gain of laser diode 155 when the near field transducer (NFT) element 156a is deteriorated. The solid line indicates an initial relationship map, and the dotted line indicates the relationship map when the neat field transducer (NFT) element is deteriorated. When the near field transducer (NFT) element is deteriorated, the near field light strength with respect to the gain of the same laser diode 155 decreases.

Figure 28:
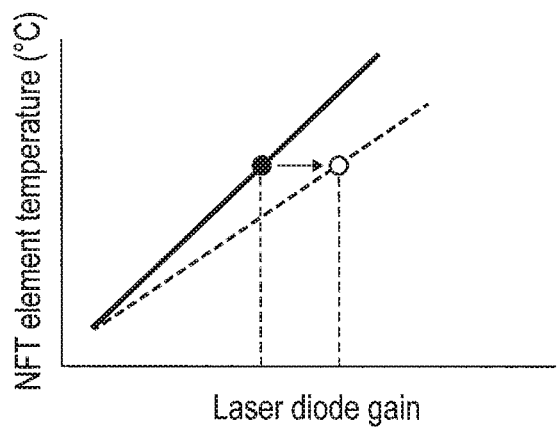
FIG. 28 illustrates an example of a relationship map between the near field transducer element temperature and the gain of the laser diode when the near field transducer element is deteriorated in the tenth embodiment.

FIG. 28 illustrates an example of a relationship map of a near field transducer (NFT) element temperature and a gain of the laser diode 155 when the near field transducer (NFT) element 156a is deteriorated. The solid line indicates an initial relationship map, and the dotted line indicates the relationship map when the neat field transducer (NFT) element is deteriorated. When the near field transducer (NFT) element is deteriorated, an incline of the near field transducer (NFT) element temperature with respect to the gain of the laser diode 155 decreases. In order to maintain the near field transducer (NFT) temperature constant, that is, to maintain the assist effect at the data recording constant, the LD controller 111a executes the feedback control, and thus, the gain of the laser diode 155 increases from its initial value when the near field transducer (NFT) element is deteriorated.

Figure 29:
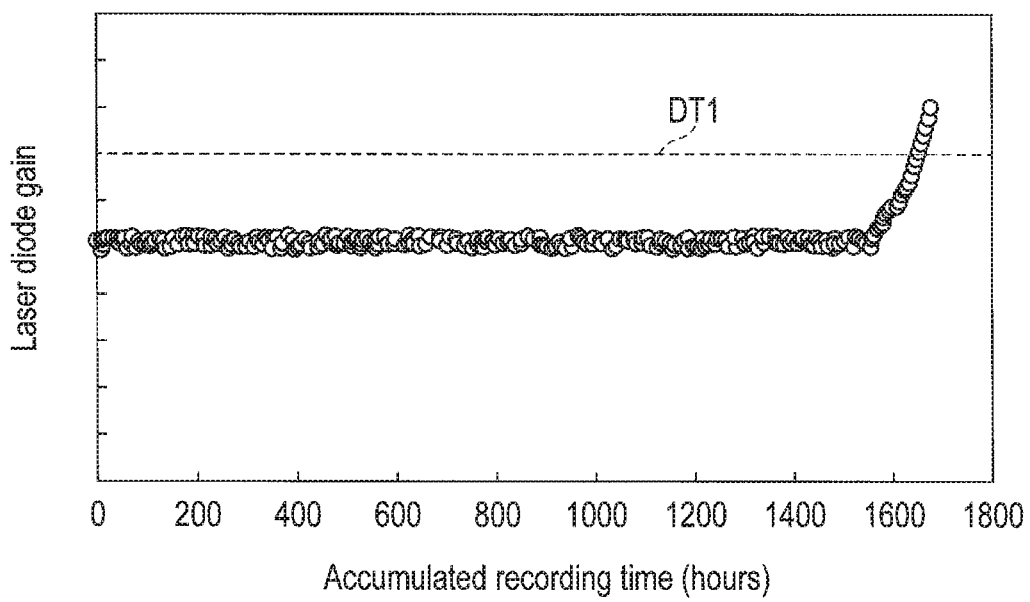
FIG. 29 illustrates an example of a relationship map between the gain of the laser diode and the accumulated recording time in the tenth embodiment.

FIG. 29 illustrates an example of a relationship map between a gain of the laser diode 155 and an accumulated recording time. In the present embodiment, the map is created when the head amplifier IC 11 detects an average value of the gain of the laser diode 155 once per hour, and the detection part 141a acquires a detected value. As in FIG. 29, the gain of the laser diode 155 increases in an accelerated manner after approximately 1600 h. Such increase of the gain occurs because the near field light strength cannot be maintained at a certain gain because of the deterioration of the near field transducer element 156a.

The detection part 141a monitors a change of the bit error rate, and furthermore, monitors a change of the gain of the laser diode 155 from its initial value through the accumulated recording time (time line). Furthermore, there is a threshold value DT1 in the gain of the laser diode 155. The threshold value DT1 is a threshold value which defines a deterioration condition of the near field transducer element 156a and is stored in the memory 16. Then, if the determination part 142a determines that the gain of the laser diode 155 exceeds the threshold value DT1 from the detection of the detection part 141a, and the assist function in the data recording time is continued, as in FIG. 29, the deterioration of the near field transducer element 156a progresses in an accelerated manner.

Figure 30:
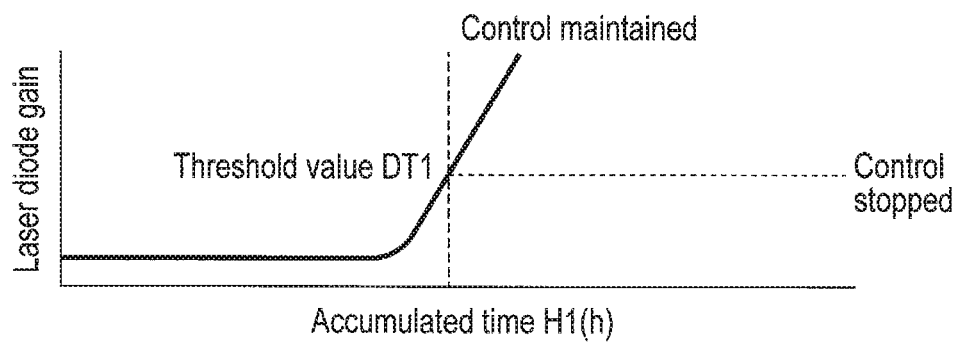
FIG. 30 illustrates an example of a relationship map between a change in the gain of the laser diode and the accumulated recording time in the tenth embodiment.

FIG. 30 illustrates an example of a relationship map between a change of the gain of the laser diode 155 and an accumulated recording time. As aforementioned with reference to FIG. 29, the gain of the laser diode 155 increases in an accelerated manner at 1600 h. However, as in FIG. 30, the adjustment part 143a stops the control of the recording control circuit 18 at a time when the gain of the laser diode 155 exceeds the threshold value DT1, and thus, as plotted by the dotted line, the increase of the gain of the laser diode 155 can be suppressed. With the control as above, the magnetic disk device 1 can suppress the deterioration of the near field transducer element 156a. Then, the magnetic disk device 1 continues the recording operation while stopping the control function of the recording control circuit 18 of the target magnetic head 10.

Figure 31:
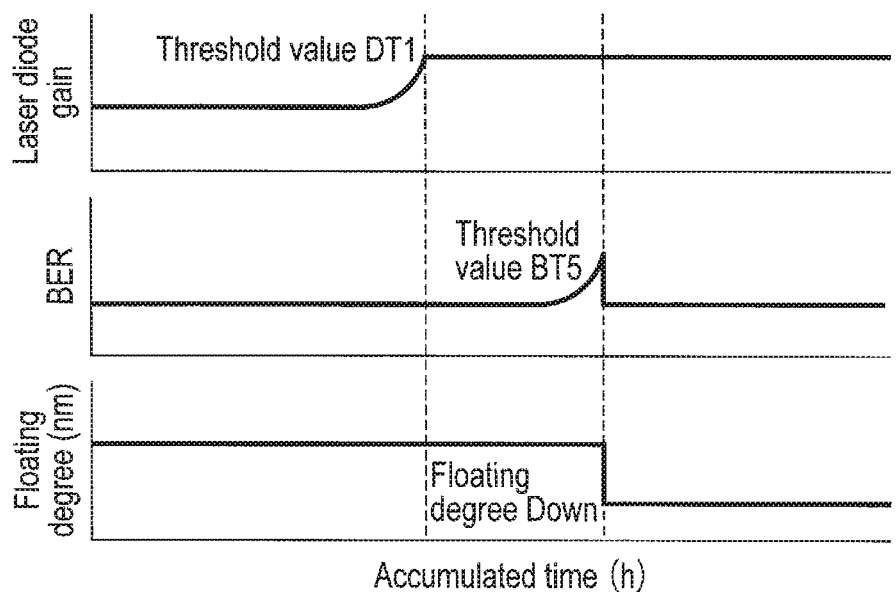
FIG. 31 is a timing chart indicative of an example of control timing of the tenth embodiment.

FIG. 31 is a timing chart in which an example of timing of adjustment of the gain of the laser diode, bit error rate, and floating degree with respect to the accumulated time. As in FIG. 31, when the gain of the laser diode 155 increases to the threshold value DT1, as described above, the control function of the recording control circuit 18 is stopped, and then, the gain of the laser diode 155 becomes constant. Thus, the deterioration of the near field transducer element 156a can be prevented. Although the gain of the laser diode 155 becomes constant, the control function of the recording control circuit 18 is stopped, that is, the assist function is stopped, and thus, the bit error rate is deteriorated accordingly. If the determination part 142a determines that the bit error rate detected by the detection part 141a exceeds a preliminary set threshold value BT5, the adjustment part 143a readjusts (decreases) the floating degree of the magnetic head 10. Thus, the deterioration of the bit error rate can be compensated by spacing. Note that, when readjusting the floating degree of the magnetic head 10, the adjustment part 143a calculates a suitable decrease based on a relationship map between the spacing and the bit error rate (which is not shown). The relationship map is preliminarily derived and is stored in the memory 16 with the threshold values DT1 and BT5. Thus, the magnetic disk device 1 suppresses the progress of the deterioration of the near field transducer element 156a used in the assist function while maintaining the read/write characteristics, and can achieve the continuous use. Thus, the life of the magnetic disk device 1 can be elongated.

Figure 32:
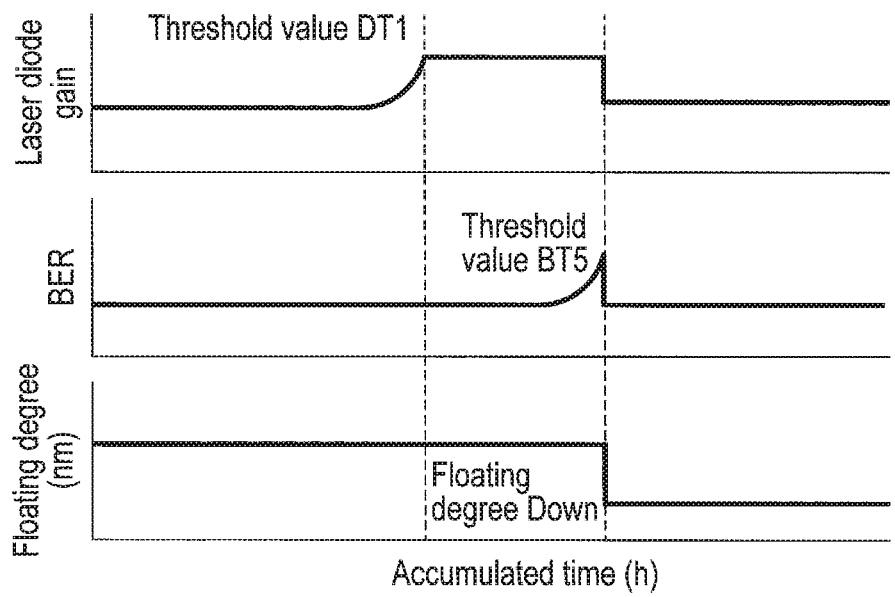
FIG. 32 is a timing chart indicative of an example of control timing of the tenth embodiment.

Note that FIG. 32 is a timing chart of an example of timing of control in a case where the determination part 142a determines that the bit error rate exceeds the threshold value BT5, and the adjustment part 143a executes a process to set the gain of the laser diode 155 to the initial value. As in FIG. 32, the initial value of the gain of the laser diode 155 is set to the initial value at a time when the bit error rate exceeds the threshold value BT5. The adjustment part 143a may execute such control.

Eleventh Embodiment

The eleventh embodiment is a process executed in a case where the gain of the laser diode exceeds a threshold value and then, the bit error rate exceeds a threshold value. Thus, the process will be explained. Note that the elements same as those of the tenth embodiment will be referred to by the same reference numbers, and the detailed description thereof will be omitted.

Figure 33:
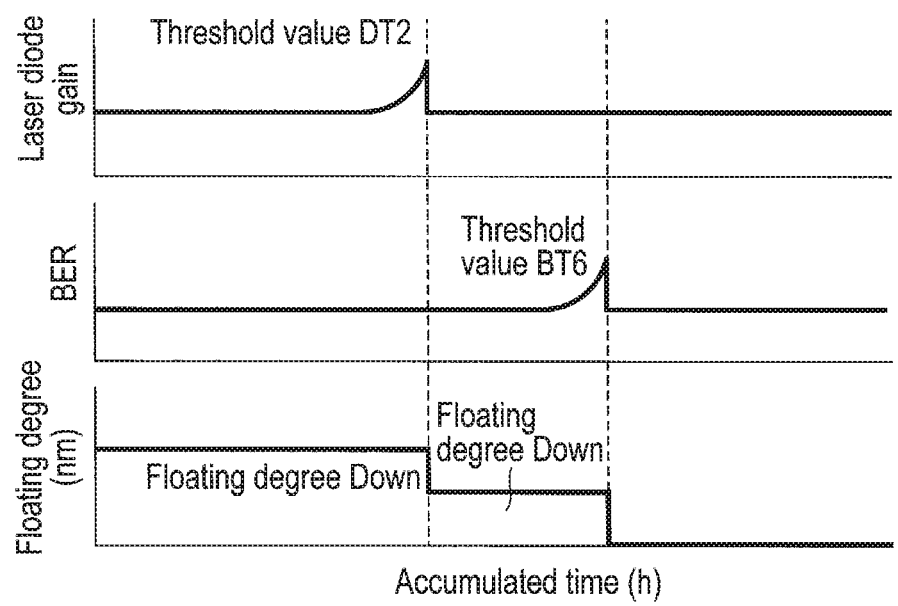
FIG. 33 is a timing chart indicative of an example of control timing of an eleventh embodiment.

FIG. 33 is a timing chart of an example of control timing to adjust a laser diode, bit error rate, and floating degree with respect to an accumulated recording time. As compared to the example of FIG. 32, the control timing is different. Note that the threshold value DT2 is a threshold value indicative of a deteriorated condition of the gain of the laser diode, and threshold value BT6 is a threshold value indicative of a deteriorated condition of the bit error rate, and these are preliminarily stored in the memory 16.

As in FIG. 33, the detection part 141a monitors the gain of the laser diode 155 and a change of the bit error rate, and if the determination part 142a determines that the gain of the laser diode 155 exceeds the threshold value DT2, the adjustment part 143a sets the gain of the laser diode 155 of the target magnetic head 10 to its initial value, and stops the control function of the recording control circuit 18 of the target head 10, that is, the assist function thereof. By stopping the assist function, the bit error rate is deteriorated, and thus, the adjustment part 143 readjusts (decreases) the floating degree of the magnetic head 10 as in the eleventh embodiment. Then, the magnetic disk device 1 continues the recording operation.

Then, if the determination part 142a determines that the bit error rate exceeds the threshold value BT6, the adjustment part 143a readjusts (decreases) the floating degree of the magnetic head 10 while maintaining the gain of the laser diode 155. Note that, when the adjustment part 143a readjusts the floating degree of the magnetic head 10, a suitable decrease is calculated from a relationship map (which is not shown) between the spacing and the bit error rate as in the tenth embodiment. Thus, the magnetic disk device 1 suppresses the progress of the deterioration of the near field transducer element 156a used in the assist function while maintaining the read/write characteristics, and can achieve the continuous use. Thus, the life of the magnetic disk device 1 can be elongated.

Twelfth Embodiment

The twelfth embodiment is a process executed in a case where the bit error rate exceeds a threshold value while the gain of the laser diode is constant. Thus, the process will be explained. Note that the elements same as those of the tenth embodiment will be referred to by the same reference numbers, and the detailed description thereof will be omitted.

FIG. 34 is a timing chart of an example of control timing to adjust a laser diode, bit error rate, and floating degree with respect to an accumulated recording time. As compared to the example of FIG. 33, the control timing is different. Note that the threshold value BT7 is a threshold value indicative of a deteriorated condition of the bit error rate, and it is preliminarily stored in the memory 16.

As in FIG. 34, the detection part 141a monitors the gain of the laser diode 155 and a change of the bit error rate, and detects that the gain of the laser diode is constant. At that time, if the determination part 142a determines that the bit error rate exceeds the threshold value BT7, the adjustment part 143 decreases the floating degree of the target magnetic head 10. Note that, when the adjustment part 143a readjusts the floating degree of the magnetic head 10, a suitable decrease is calculated from a relationship map (which is not shown) between the spacing and the bit error rate as in the tenth and eleventh embodiments.

In the present embodiment, since the gain of the laser diode 155 is not changed, the assist function continued by the target magnetic head 10 has a small influence to the life of the magnetic head 10. Thus, the adjustment part 143 adjusts the floating degree of the magnetic head 10 while maintaining the assist function as in FIG. 34. Thus, the magnetic disk device 1 suppresses the progress of the deterioration of the near field transducer element 156a used in the assist function while maintaining the read/write characteristics, and can achieve the continuous use. Thus, the life of the magnetic disk device 1 can be elongated.

Thirteenth Embodiment

The thirteenth embodiment is a process executed in a case where the bit error rate exceeds a threshold value and then, the gain of the laser diode exceeds a threshold value. Thus, the process will be explained. Note that the elements same as those of the tenth embodiment will be referred to by the same reference numbers, and the detailed description thereof will be omitted.

FIG. 35 is a timing chart of an example of control timing to adjust a laser diode, bit error rate, and floating degree with respect to an accumulated recording time. As compared to the example of FIG. 33, the control timing is different. Note that the threshold value DT3 is a threshold value indicative of a deteriorated condition of the laser diode, and it is preliminarily stored in the memory 16.

As in FIG. 35, the detection part 141a monitors the gain of the laser diode 155 and a change of the bit error rate, and detects that the gain of the laser diode is constant. At that time, if the determination part 142a determines that the bit error rate exceeds the threshold value BT8, the adjustment part 143 decreases the floating degree of the target magnetic head 10.

As above, the floating degree of the magnetic head 10 is decreased, and then, if the determination part 142a determines that the gain of the laser diode 155 exceeds the threshold value DT3, the adjustment part 143a decreases the floating degree of the magnetic head 10, and stops the function of the recording control circuit 18, that is, the assist function. Note that, when the adjustment part 143a readjusts the floating degree of the magnetic head 10, a suitable decrease is calculated from a relationship map (which is not shown) between the spacing and the bit error rate as in the tenth to twelfth embodiments. Furthermore, as in the eleventh embodiment, the adjustment part 143a may set the gain of the laser diode 155 to its initial value, and furthermore, decrease the floating degree of the magnetic head 10. Thus, the magnetic disk device 1 suppresses the progress of the deterioration of the near field transducer element 156a used in the assist function while maintaining the read/write characteristics, and can achieve the continuous use. Thus, the life of the magnetic disk device 1 can be elongated.

Fourteenth Embodiment

In the present embodiment, the detection part 141a monitors an accumulated recording time while a thermal assist function is turned on in addition to the gain of the laser diode 155 and a change in the bit error rate, and in this respect, the present embodiment is different from the above embodiments. Thus, said additional process will be explained. Note that the elements same as those of the tenth embodiment will be referred to by the same reference numbers, and the detailed description thereof will be omitted.

The detection part 141a monitors, in addition to the gain of the laser diode 155 and a change in the bit error rate, an input time of the laser diode 155 of each magnetic head 10, that is, an accumulated recording time while the thermal assist function is turned on. Then, the determination part 142a stops the assist function (control function by the control circuit 18) of the magnetic head 10 which is beyond the five-year warrant target time regardless of the deterioration of the gain of the laser diode 155 based on a relationship map between the head breakdown and the accumulated time (which is not shown). The magnetic disk device 1 executes the recording operation while maintaining the assist function of other magnetic heads 10. Then, if the determination part 142a determines that the deterioration of the bit error rate exceeds the threshold value, the adjustment part 143a decreases, while maintaining the assist function of the target magnetic head 10, the floating degree of the magnetic head 10. Note that, when the adjustment part 143a readjusts the floating degree of the magnetic head 10, a suitable decrease is calculated from a relationship map (which is not shown) between the spacing and the bit error rate as in the tenth to thirteenth embodiments. Thus, the magnetic disk device 1 can readjust the floating degree of the magnetic head 10 within a range in which a desired life target is satisfied.

Fifteenth Embodiment

In the present embodiment, a process related to an RW element is added, and in this respect, the present embodiment is different from the above embodiments. Thus, said additional process will be explained. Note that the elements same as those of the tenth embodiment will be referred to by the same reference numbers, and the detailed description thereof will be omitted.

In the present embodiment, while the laser diode 155 is turned on, a change in the bit error rate with respect to a change in spacing between two points is measured in each magnetic head 10, and data indicative of a result of the measurement will be stored in a monitor area (system area) 200 on the magnetic disk 2. Then, as in the tenth to fourteenth embodiment, if the determination part 142 determines that the near field transducer element 156a is in a deteriorated condition, the adjustment part 143 refers to a relationship map of sensitivity (which is not shown) between the bit error rate and a change in the head-medium spacing from the monitor area 200 when readjusting the floating degree of the magnetic head 10, and adjusts the floating degree of the magnetic head 10 based on the relationship map. Thus, the magnetic disk device 1 can calculate a suitable decrease of the target magnetic head 10 in consideration of varieties of the characteristics of the magnetic head 10. Thus, the magnetic disk device 1 can calculate a suitable decrease of the target magnetic head 10 in consideration of varieties of characteristics of the magnetic head 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head including an assist part to assist recording of data into the magnetic disk;
   a controller configured to control the recording of data by the magnetic head based on a recording condition; and
   a memory configured to record a first threshold value used to define that an assist element included in the assist part is in a deterioration condition, wherein
   the controller detects the condition of the assist element, determines whether or not the recording condition is changed based on the detected condition and the first threshold value stored in the memory, and changes the recording condition based on the result of the determination; wherein
   the assist element is a high frequency oscillator,
   the assist part is a high frequency assist recorder using the high frequency oscillator,
   the condition of the high frequency oscillator detected by the controller is an electrical resistance value of the high frequency oscillator, and
   the controller changes the recording condition, if the electrical resistance value detected is determined to be above the first threshold value, to decrease a voltage applied to the high frequency oscillator and to decrease a floating degree of the magnetic head with respect to a recording surface of the magnetic disk.

2. The magnetic disk device of claim 1, wherein
   the memory stores a first relationship map indicative of a relationship between a life of the magnetic head and the floating degree, and
   the controller adjusts the decrease of the floating degree while maintaining the life of the magnetic head for a certain period of time based on the first relationship map.

3. The magnetic disk device of claim 1, wherein
   the memory stores, in addition to the first threshold value, a second threshold value used to define that the high frequency oscillator is in a further deteriorated condition as compared to the first threshold value, and
   the controller changes the recording condition to decrease a voltage applied to the high frequency oscillator and to decrease the floating degree of the magnetic head with respect to the recording surface if the electrical resistance value is determined to be above the first threshold value, and changes the recording condition to stop the voltage applied to the high frequency oscillator and to further decrease the floating degree if the electrical resistance value is determined to be above the second threshold value.

4. The magnetic disk device of claim 1, wherein
   the memory stores a third threshold value used to define that a bit error rate is in a deteriorated condition, and
   the controller detects, in addition to the electrical resistance value of the high frequency oscillator, the bit error rate at the time of recording of the data by the magnetic head, determines whether or not the recording condition is changed based on the condition of the bit error rate detected and the third threshold value stored in the memory, and changes the recording condition based on the result of the determination.

5. The magnetic disk device of claim 1, wherein the controller changes the recording condition to decrease the floating degree of the magnetic head with respect to the recording surface of the magnetic disk if the bit error rate is determined to be above the third threshold value.

6. The magnetic disk device of claim 1, wherein
   the memory stores a second relationship map indicative of a relationship between a total time of applying voltage to the high frequency oscillator and a life of the magnetic head including the high frequency oscillator, and
   the controller detects, in addition to the electrical resistance value of the high frequency oscillator, the total time, and stops the voltage applied to the high frequency oscillator if the total time detected is a time indicative of the life based on the second relationship map.

* * * * *